United States Patent
Iwahashi et al.

(10) Patent No.: US 8,300,921 B2
(45) Date of Patent: Oct. 30, 2012

(54) INSPECTION APPARATUS AND INSPECTION METHOD

(75) Inventors: Takashi Iwahashi, Osaka (JP);
Toshihiko Tsujikawa, Osaka (JP);
Atsushi Katayama, Kyoto (JP)

(73) Assignee: Panasonic Corporation, Osaka (JP)

( * ) Notice: Subject to any disclaimer, the term of this patent is extended or adjusted under 35 U.S.C. 154(b) by 338 days.

(21) Appl. No.: 12/863,776

(22) PCT Filed: Jan. 21, 2009

(86) PCT No.: PCT/JP2009/000199
§ 371 (c)(1),
(2), (4) Date: Jul. 21, 2010

(87) PCT Pub. No.: WO2009/093445
PCT Pub. Date: Jul. 30, 2009

(65) Prior Publication Data
US 2010/0296721 A1    Nov. 25, 2010

(30) Foreign Application Priority Data
Jan. 25, 2008    (JP) .................................. 2008-015158

(51) Int. Cl.
*G05B 19/18* (2006.01)
*G06K 9/00* (2006.01)
*G03H 1/26* (2006.01)
(52) U.S. Cl. ................ 382/141; 700/58; 700/59; 359/22
(58) Field of Classification Search .................... 359/22; 700/58, 59; 382/141
See application file for complete search history.

(56) References Cited

U.S. PATENT DOCUMENTS

| | | | | |
|---|---|---|---|---|
| 5,173,759 A | * | 12/1992 | Anzaki et al. | 257/88 |
| 5,206,700 A | * | 4/1993 | Reynolds et al. | 356/237.2 |
| 5,854,745 A | * | 12/1998 | Muraoka et al. | 700/58 |

(Continued)

FOREIGN PATENT DOCUMENTS

JP    58-213382    12/1983

(Continued)

OTHER PUBLICATIONS

International Search Report issued Mar. 24, 2009 in International (PCT) Application No. PCT/JP2009/000199.

*Primary Examiner* — Ryan Zeender
*Assistant Examiner* — Ariel Yu
(74) *Attorney, Agent, or Firm* — Wenderoth, Lind & Ponack, LLP.

(57) ABSTRACT

An object of the present invention is to provide an inspection apparatus and an inspection method for precisely detecting an amount of misalignment of a component mounted on a panel through an adhesive which contains conductive particles. An inspection apparatus according to an implementation of the present invention detects an amount of misalignment, from a predetermined mounting position, of a component mounted on a surface of a panel through an ACF. The inspection apparatus includes: an infrared light illuminator which illuminates with an infrared light a panel recognition mark and a component recognition mark, the panel recognition mark being formed on the surface of the panel, and the component recognition mark being formed on a surface of the component; an IR camera which is provided opposite the infrared light illuminator in relation to the panel, and captures an image of the panel recognition mark and an image of the component recognition mark which are illuminated with the infrared light; and an amount of misalignment calculation unit which calculates, using the images captured by the IR camera, an amount of misalignment in a positional relationship between the panel recognition mark and the component recognition mark from a predetermined positional relationship, and an optical axis of the infrared light illuminator is inclined with respect to a normal found on the surfaces of the panel or the component.

11 Claims, 21 Drawing Sheets

U.S. PATENT DOCUMENTS

| | | | |
|---|---|---|---|
| 5,858,806 A | | 1/1999 | Nishida |
| 6,055,055 A | * | 4/2000 | Toh ................................ 356/609 |
| 7,649,661 B2 | * | 1/2010 | Chuang et al. .................. 359/22 |
| 2005/0071997 A1 | * | 4/2005 | Oyama et al. .................... 29/832 |
| 2006/0245171 A1 | * | 11/2006 | Kim et al. ...................... 361/752 |
| 2009/0010591 A1 | * | 1/2009 | Iwamori et al. ................. 385/14 |

FOREIGN PATENT DOCUMENTS

| | | |
|---|---|---|
| JP | 3-260777 | 11/1991 |
| JP | 7-273497 | 10/1995 |
| JP | 9-196617 | 7/1997 |
| JP | 9-219584 | 8/1997 |
| JP | 2000-259830 | 9/2000 |
| JP | 3323395 | 9/2002 |
| JP | 2004-031868 | 1/2004 |
| JP | 2006-040978 | 2/2006 |

* cited by examiner

FIG. 9
(a)
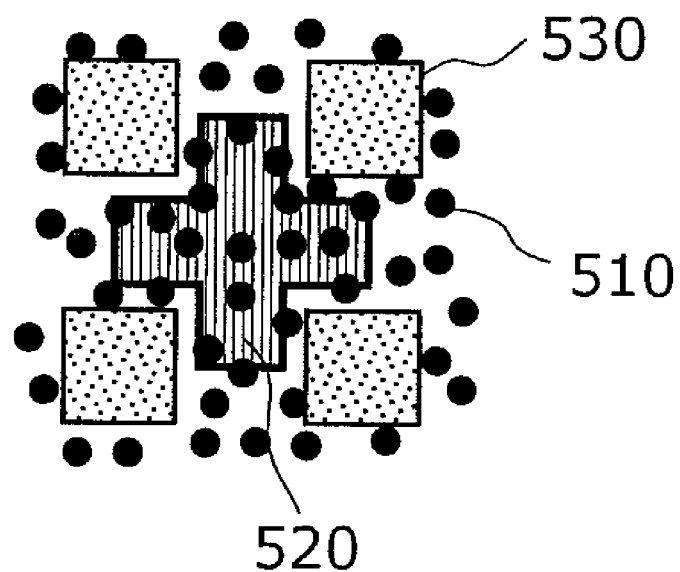
(b)
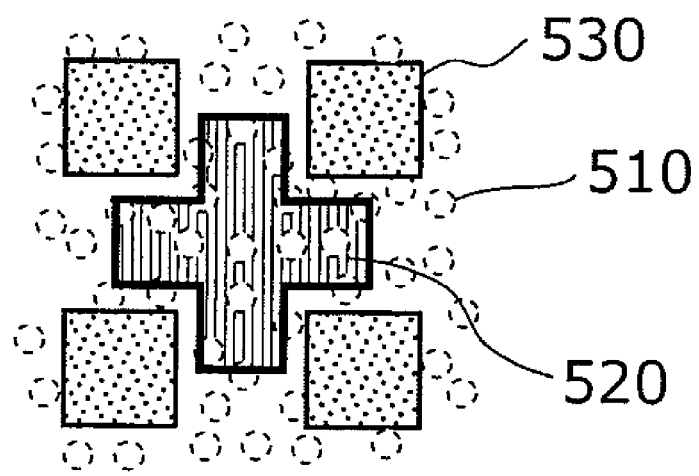

FIG. 11A

| Illuminating angle | Mark image | Assessment result of image |
|---|---|---|
| 70° | | × (ACF obvious) |
| 80° | | × (ACF obvious) |
| 85° | | × (ACF obvious) |
| 50° | | ○ |
| 55° | | ○ |
| 60° | | × (ACF obvious) |
| 30° | | × (Note: Substrate mark unrecognizable) |
| 40° | | × (Note: Substrate mark unrecognizable) |
| 45° | | ○ |

FIG. 16

| Illuminating angle | Mark image | Assessment result of image |
|---|---|---|
| 30° | — | × (Note: Luminance intensity insufficient) |
| 40° | | × (Note: Substrate mark unrecognizable) |
| 45° | | × |

| Illuminating angle | Mark image | Assessment result of image |
|---|---|---|
| 50° | | ○ |
| 55° | | ○ |
| 60° | | ○ |

| Illuminating angle | Mark image | Assessment result of image |
|---|---|---|
| 70° | | ○ |
| 80° | | ○ |
| 85° | | × |

INSPECTION APPARATUS AND INSPECTION METHOD

TECHNICAL FIELD

The present invention relates to inspection apparatuses and inspection methods, and particularly to an inspection apparatus and an inspection method for inspecting a mounting status of an electronic component mounted on a substrate.

BACKGROUND ART

Conventionally, electronic components (hereinafter referred to as components), such as tape automated bonding (TAB) substrates, semiconductor elements, and flexible substrates which have an electrode, are mounted on flat panel displays (hereinafter referred to as panels) such as liquid crystal displays and plasma displays which have an electrode made of indium in oxide (ITO) and the like.

This mounting involves temporary and permanent compression-bonding of a component to a panel while providing an anisotropic conductive film (hereinafter referred to as an ACF) between the component and the panel, so as to bond the electrode of the panel and the electrode of the component. The temporary compression-bonding involves softly pressing the component using a thermocompression-bonding head, and the permanent compression-bonding following the temporary compression-bonding involves pressing the temporary compression-bonded component using a thermocompression-bonding head under a pressure and a temperature higher than in the temporal compression-bonding. Then, an amount of relative misalignment (amount of misalignment) of the component from a predetermined mounting position is detected by an inspection apparatus. The detected amount of misalignment is provided as feedback for the next mounting of a component on the panel, and the mounting is performed in which the misalignment is corrected.

An example of the inspection apparatus which detects the amount of component misalignment is one disclosed in Patent Reference 1. With this inspection apparatus, an amount of misalignment is detected as an amount of misalignment of a component mounted on a panel by detecting an amount of misalignment of an alignment mark provided on a panel (transparent substrate) and an alignment mark provided on a component.

Patent Reference 1: Japanese Unexamined Patent Application Publication No. 2006-40978

DISCLOSURE OF INVENTION

Problems that Invention is to Solve

On the inspection apparatus according to Patent Reference 1, the position of the alignment mark of a component is detected as follows: a near-infrared light is illuminated from a side of a bottom surface of the panel (a surface of the panel with no component mounted thereon) on the alignment mark, the alignment mark is captured on the side of the bottom surface of the panel by the imaging device, and the position of the alignment mark of the component is detected based on the captured result. However, conductive particles, such as metal, are difficult to be transparent or not transparent at all for a near-infrared light. Thus, a near-infrared light illuminated from the side of the bottom surface of the panel never reaches the alignment mark provided on the component. Hence, the alignment mark on the component cannot be captured. As the mounting pitch of components becomes narrower, the conductive particles become smaller and denser, making it more likely for the light to be shielded by the conductive particles, which means that it is more difficult for the light to reach the imaging apparatus. As a result, recognition of the alignment mark provided on the component is difficult. This problem appears more significant as the mounting pitch of components becomes narrower. Thus, with this inspection apparatus, it is very difficult to precisely detect an amount of misalignment of a component mounted on the panel through an adhesive, such as the ACF, which contains conductive particles.

In view of the above problem, an object of the present invention is to provide an inspection apparatus and an inspection method for precisely detecting an amount of misalignment of a component mounted on a panel through an adhesive which contains conductive particles.

Means to Solve the Problems

In order to achieve the above object, an inspection apparatus according to an aspect of the present invention detects an amount of misalignment, from a predetermined mounting position, of a component mounted on a surface of a panel through an adhesive which contains conductive particles. The inspection apparatus includes: an illuminating unit which illuminates with a light a panel recognition mark and a component recognition mark, the panel recognition mark being formed on the surface of the panel, and the component recognition mark being formed on a surface of the component which faces the surface of the panel on which the component is mounted; a camera which is provided opposite the illuminating unit in relation to the panel, and captures an image of the panel recognition mark and an image of the component recognition mark which are illuminated with the light; and a calculation unit which calculates, using the images captured by the camera, an amount of misalignment in a positional relationship between the panel recognition mark and the component recognition mark from a predetermined positional relationship, wherein the illuminating unit emits a light having a wavelength that allows the light to pass through the panel and the component but does not allow or does not easily allow the light to pass through the conductive particles, and an optical axis of the illuminating unit is inclined with respect to a normal found on the surfaces of the panel or the component.

In this structure, the illuminating unit is used to capture the panel recognition mark and the component recognition mark. Here, the optical axis of the illuminating unit is inclined with respect to the normal found on surface of the panel and the component. Hence, the light from the illuminating unit is easily scattered by the conductive particles, and the scattered light enters the camera to form images of the panel recognition mark and the component recognition mark. Hence, misrecognition caused by an effect of the conductive particles can be alleviated. As a result, an amount of misalignment of the component can be calculated with an effect of the conductive particles alleviated. This makes it possible to precisely detect the amount of misalignment of the component mounted on the panel through an adhesive which contains the conductive particles.

Here, the optical axis of the illuminating unit may intersect with the panel recognition mark or the component recognition mark. The optical axis of the illuminating unit preferably forms an angle of equal to 45° or greater and smaller than 60° with the surfaces of the panel or the component. The illuminating unit is preferably provided on a side of a bottom surface of the panel opposite a surface of the panel on which the component is mounted, and the optical axis of the illuminating unit preferably intersects with the component recognition mark, and forms the angle of equal to 45° or greater and smaller than 60° with the surface of the component.

The above structure makes it possible to directly illuminate the panel recognition mark and the component recognition mark with a light from the illuminating unit. This eliminates the need for employing an illuminating unit having a great light amount an amount of the light coming from the infrared light illuminator 305, and achieves lower power consumption.

The optical axis of the illuminating unit does not have to intersect with either the panel recognition mark or the component recognition mark. Here, the optical axis of the illuminating unit preferably forms an angle of equal to 50° or greater and smaller than 85° with the surfaces of the panel or the component. The illuminating unit is preferably provided on a side of a bottom surface of the panel opposite a side of the panel on which the component is mounted, and the optical axis of the illuminating unit preferably forms the angle of equal to 50° or greater and smaller than 85° with the surface of the component recognition mark.

Since the above structure makes it possible to obtain images having a panel recognition mark and a component recognition mark which are clearly recognizable with a wider range of angles; namely, equal to 50° or greater and smaller than 85°. This structure allows the inspection apparatus according to the aspect of the present invention to be designed more freely.

The illuminating unit preferably includes illuminators which illuminate with lights the panel recognition mark and the component recognition mark at different directions. Here, each of the illuminators is provided so that an optical axis of the illuminator is perpendicular to a straight line forming an outline of the panel recognition mark or an outline of the component recognition mark.

This structure makes it possible to obtain an image having enhanced edges of the panel recognition mark and the component recognition mark.

An inspection method according to another aspect of the present invention is employed for detecting an amount of misalignment, from a predetermined mounting position, of a component mounted on a surface of a panel through an adhesive which contains conductive particles. The inspection method includes: illuminating with a light a panel recognition mark and a component recognition mark using an illuminating unit, the panel recognition mark being formed on the surface of the panel, and the component recognition mark being formed on a surface of the component which faces the surface of the panel on which the component is mounted; capturing an image of the panel recognition mark and an image of the component recognition mark which are illuminated with the light, using a camera provided opposite the illuminator in relation to the panel; and calculating, using the images captured by the camera in the capturing, an amount of misalignment in a positional relationship between the panel recognition mark and the component recognition mark from a predetermined positional relationship, wherein the illuminating involves emitting a light having a wavelength that allows the light to pass through the panel and the component but does not allow or does not easily allow the light to pass through the conductive particles, and an optical axis of the illuminating unit is inclined with respect to a normal found on the surfaces of the panel or the component.

This method makes it possible to precisely detect the amount of misalignment of the component mounted on the panel through the adhesive containing the conductive particles.

Effects of the Invention

The present invention provides an inspection apparatus and an inspection method for precisely detecting an amount of misalignment of a component mounted on a panel through an adhesive which contains conductive particles.

BRIEF DESCRIPTION OF DRAWINGS

FIG. 9(a) shows an example of an image captured by an IR camera. FIG. 9(b) shows an example of an image captured by an IR camera.

FIG. 11A shows a relationship between an illuminating angle, an assessment result of an image, and a mark image.

FIG. 16 shows a relationship between an illuminating angle, an assessment result of an image, and a mark image.

NUMERICAL REFERENCES

Figure 1:
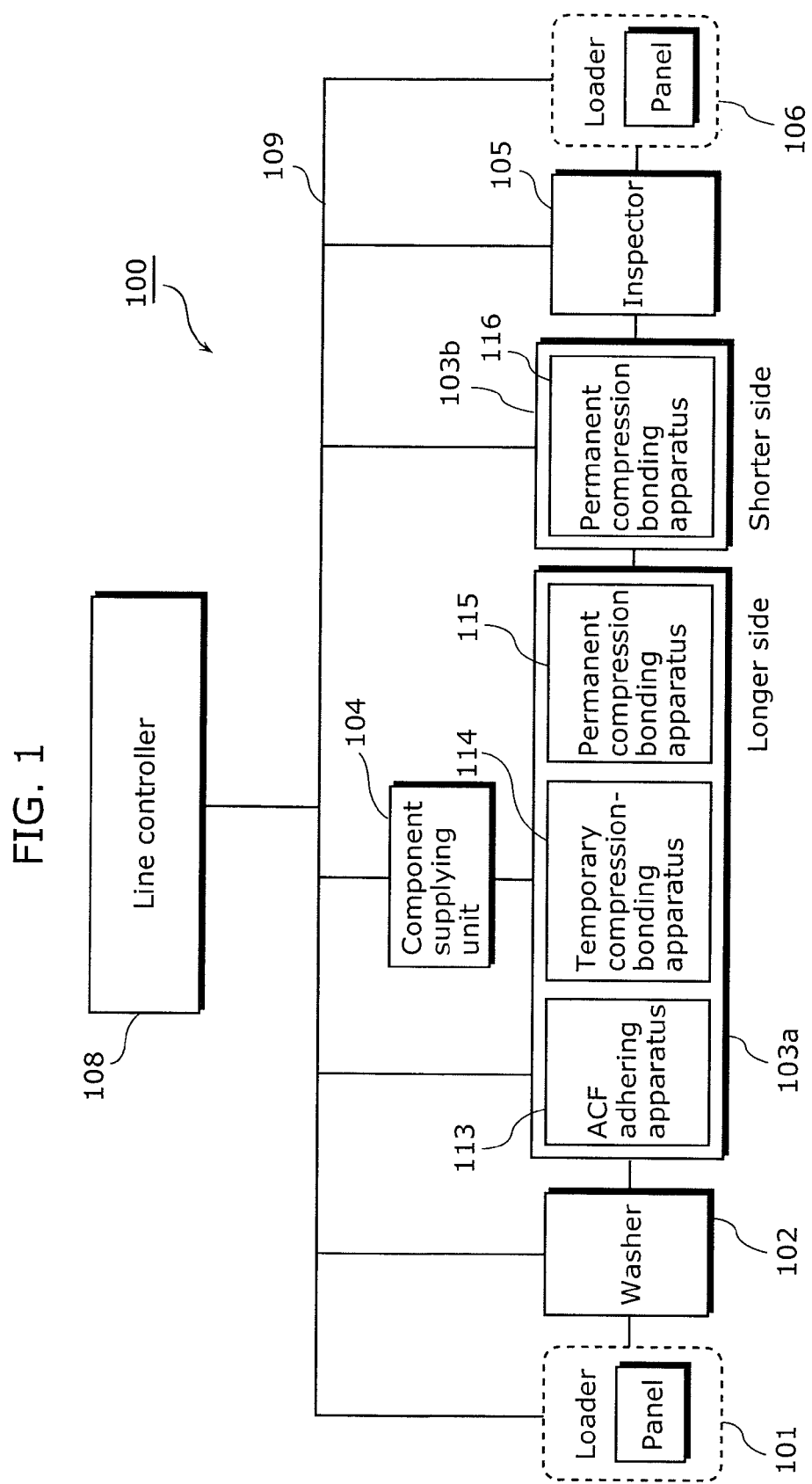
FIG. 1 is a conceptual diagram showing an entire configuration of a component mounting system according to an Embodiment of the present invention.

100 Component mounting system
100, 106 Loader
102 Washer
103a, 103b Panel mounter
104 Component supplying unit
105 Inspector
108 Line controller
109 Communication cable
113 ACF adhering apparatus
114 Temporary compression-bonding apparatus
115, 116 Permanent compression-bonding apparatus
200 Panel
201 Component
202, 204, 206 Thermocompression-bonding head
203, 205, 207, 301 Back-up stage
300 Mounting-completed panel
302 Panel transfer stage unit
303 Under-panel transfer shaft unit
305 Infrared light illuminator
307 IR camera
410, 430, 440 Control unit
411, 431, 441 Storage unit
411a Master table
412, 432, 442 Input unit
413, 433, 443 Display unit
414, 434, 444 Communication I/F unit
415 Operation unit
431a Feedback data
435, 445 Mechanical unit
436 Data updating unit
441a Inspection position data
441b Feature point data
446 Amount-of-misalignment calculation unit
448 Obtaining unit
500 ACF
510 Conductive particles
520 Component recognition mark
530 Panel recognition mark

BEST MODE FOR CARRYING OUT THE INVENTION

Hereinafter, a component mounting system according to an Embodiment of the present invention is described with reference to the drawings.

FIG. 1 is a conceptual diagram showing an entire configuration of a component mounting system 100 of the present Embodiment.

The component mounting system 100 includes a line including: a loader 101; a washer 102; two panel mounters 103a and 103b; a component supplying unit 104; an inspector 105; and a loader 106, a line controller 108, and a communication cable 109.

The loader 101 supplies a panel to the line. The washer 102 washes a part of the panel supplied by the loader 101, the part to which the ACF is to be adhered. The two panel mounters 103a and 103b mount components on different sides of the panel. The component supplying unit 104 supplies a component to the panel mounter 103a. The inspector 105 detects an amount of relative misalignment (amount of misalignment), of a component mounted on the top surface of the panel through the ACF, seen from a predetermined mounting position of the component. The loader 106 ejects the panel on which the components have been mounted (hereinafter referred to as a mounting-completed panel). The line controller 108 manages and controls communication and so on of various data and the operating status of the whole line. The communication cable 109 connects the line controller 108 with each element of the line.

The panel mounter 103a includes an ACF adhering apparatus 113, a temporary compression-bonding apparatus 114, and a permanent compression-bonding apparatus 115. The ACF adhering apparatus 113 adheres an ACF to a longer side and a shorter side of the panel's top surface. The temporary compression-bonding apparatus 114 places a component using a thermocompression-bonding head, and softly presses the component to temporarily compression-bond the component to the panel's top surface. The permanent compression-bonding apparatus 115 presses the component, which has been temporarily compression-bonded to the longer side of the panel's top surface, using a thermocompression-bonding head under a pressure and a temperature higher than those in the temporal compression-bonding, so as to permanently compression-bond the component to the panel's top surface.

The panel mounter 103b includes a permanent compression-bonding apparatus 116. The permanent compression-bonding apparatus 116 presses the component, which has been temporarily compression-bonded to the shorter side of the panel's top surface, using a thermocompression-bonding head under a pressure and a temperature higher than those in the temporal compression-bonding, so as to permanently compression-bond the component to the panel's top surface.

Figure 2:
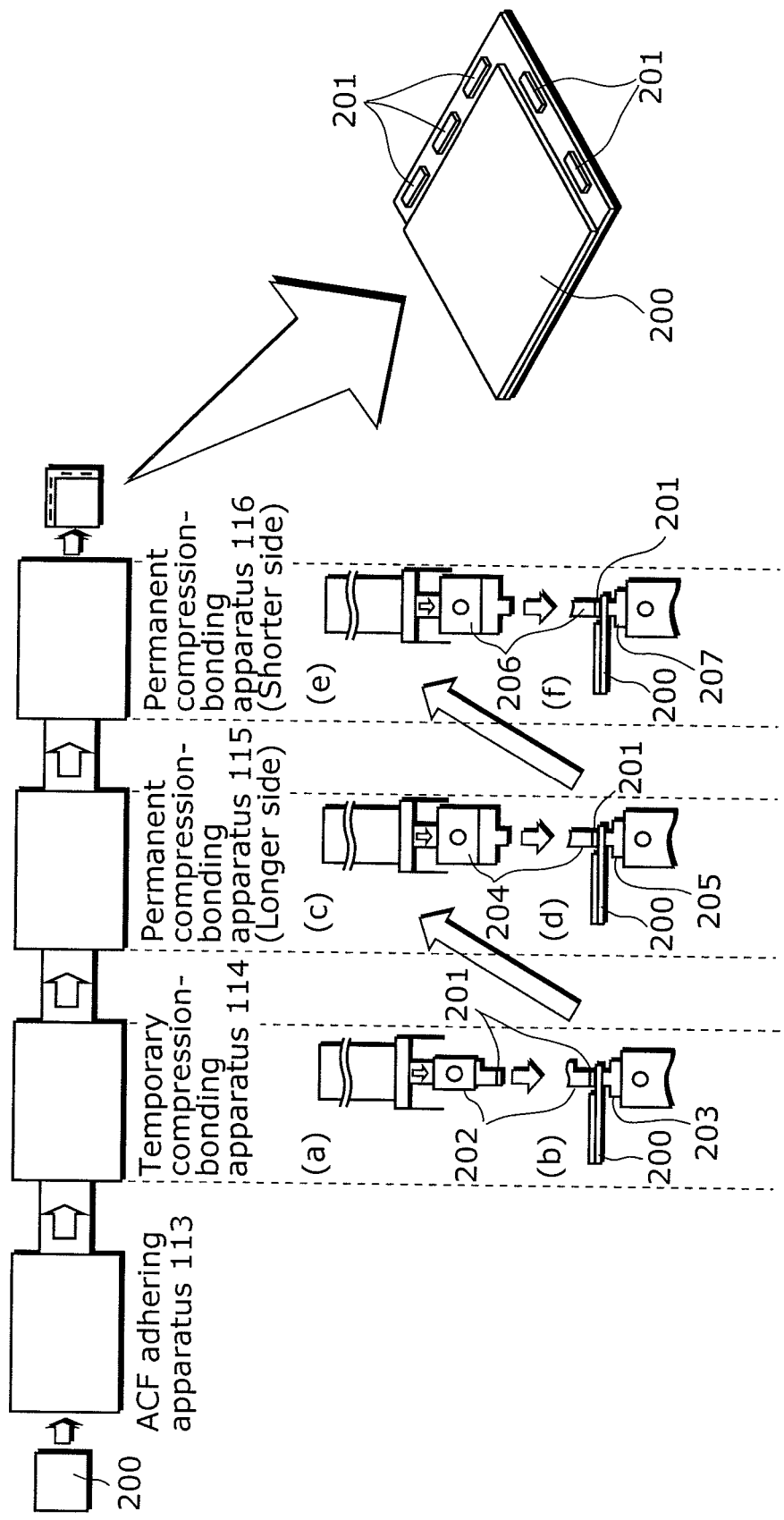
FIG. 2 shows how panel mounters of the component mounting system mount components on a panel.

FIG. 2 shows how the panel mounters 103a and 103b mount a component 201 components on a panel 200.

First, the ACF adhering apparatus 113 adheres an ACF at the edges of the top surface of a panel 200, and then transfers the panel 200 to the temporary compression-bonding apparatus 114.

Next, the temporary compression-bonding apparatus 114 lowers a thermocompression-bonding head 202 holding the component 201 (FIG. 2(a)), and temporarily compression-bonds the component 201 to the region of the top surface of the panel 200 placed on a back-up stage 203, the top surface to which the ACF has been adhered (FIG. 2(B)).

Then, after the panel 200 is transferred to the permanent compression-bonding apparatus 115, the permanent compression-bonding apparatus 115 lowers a thermocompression-bonding head 204 (FIG. 2(c)) and permanently compression-bonds the component 201 which has been temporarily compression-bonded to the longer side of the top surface of the panel 200 placed on a back-up stage 205 (FIG. 2(d)).

Lastly, after the panel 200 is transferred to the permanent compression-bonding apparatus 116, the permanent compression-bonding apparatus 116 lowers a thermocompression-bonding head 206 (FIG. 2(e)) and permanently compression-bonds the component 201 which has been temporarily compression-bonded to the shorter side of the top surface of the panel 200 placed on a back-up stage 207 (FIG. 2(f)).

Figure 3:
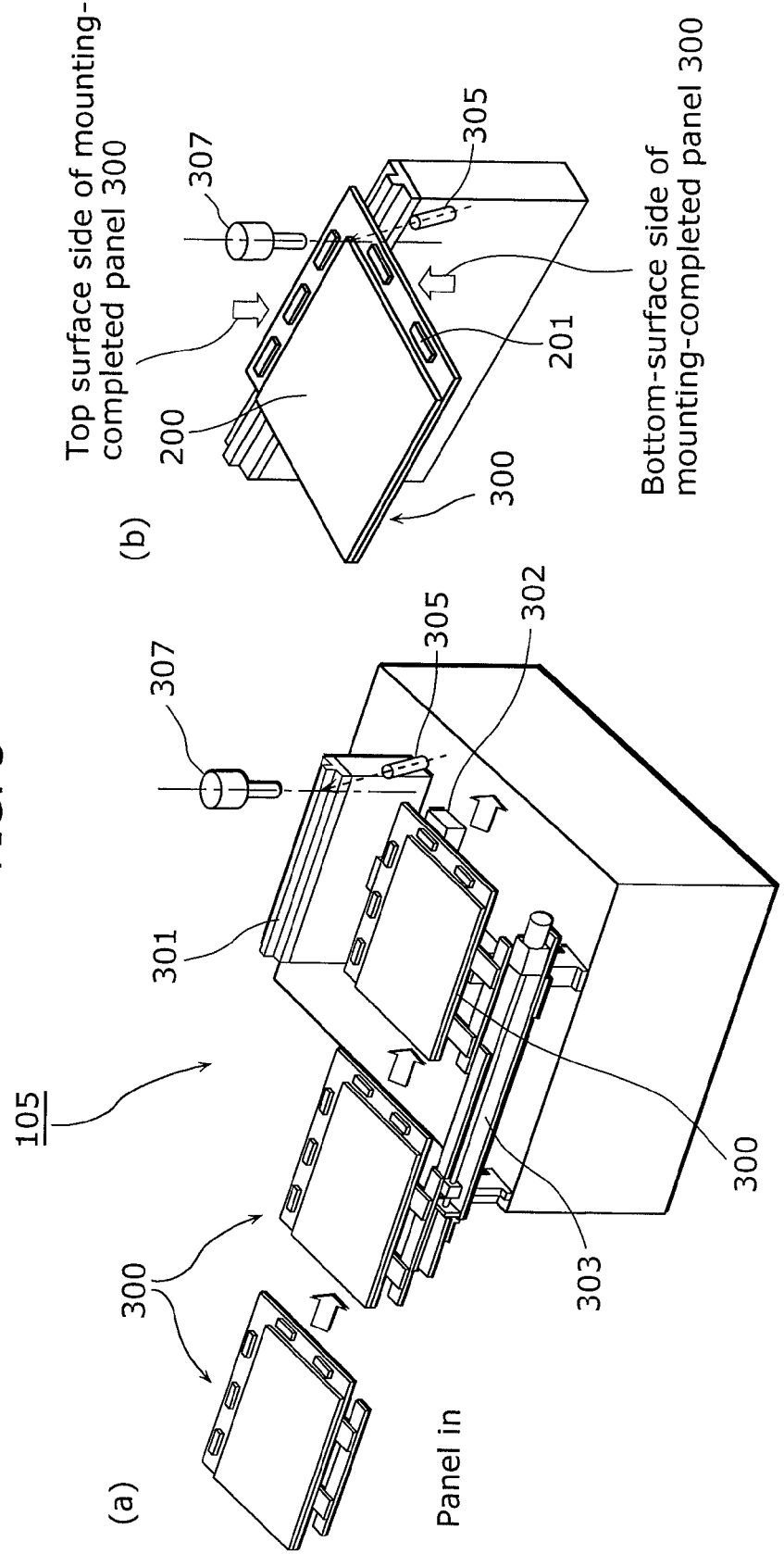
FIG. 3(a) is a perspective view showing a schematic configuration of an inspector of the component mounting system.
FIG. 3(b) shows how an inspector of the component mounting system inspects a mounting-completed panel.

FIG. 3(a) is a perspective view showing a schematic configuration of the inspector 105, and FIG. 3(b) shows how the inspector 105 inspects a mounting-completed panel 300.

The inspector 105 includes a back-up stage 301, a panel transfer stage unit 302, an under-panel transfer shaft unit 303, an infrared light illuminator 305, and an infrared (IR) camera 307.

The back-up stage 301 has the mounting-completed panel 300 placed. The panel transfer stage unit 302 transfers the mounting-completed panel 300 to the back-up stage 301. The under-panel transfer shaft unit 303 transfers the mounting-completed panel 300 to the panel transfer stage unit 302.

The infrared light illuminator 305 is provided on a side of a bottom surface of the panel 200 (a surface of the panel 200 opposite the top surface of the panel 200 on which the component 201 is mounted), and illuminates the bottom surface of the mounting-completed panel 300 with an infrared light. The bottom surface of the mounting-completed panel 300 represents a bottom surface opposite the top surface of the panel 200 on which the component 201 is mounted thereon. Since the panel 200 is transparent for an infrared light, the infrared light emitted by the infrared light illuminator 305 passes through the panel 200, and illuminates the following: a panel recognition mark formed on a surface (a surface of the panel 200 on which the component 201 is mounted) of the panel 200; and a component recognition mark formed on a surface (a surface of the component 201 which is in parallel to the surface of the panel 200 and bonds to the panel 200) of the component 201 which faces the surface of the panel 200.

Figure 4:
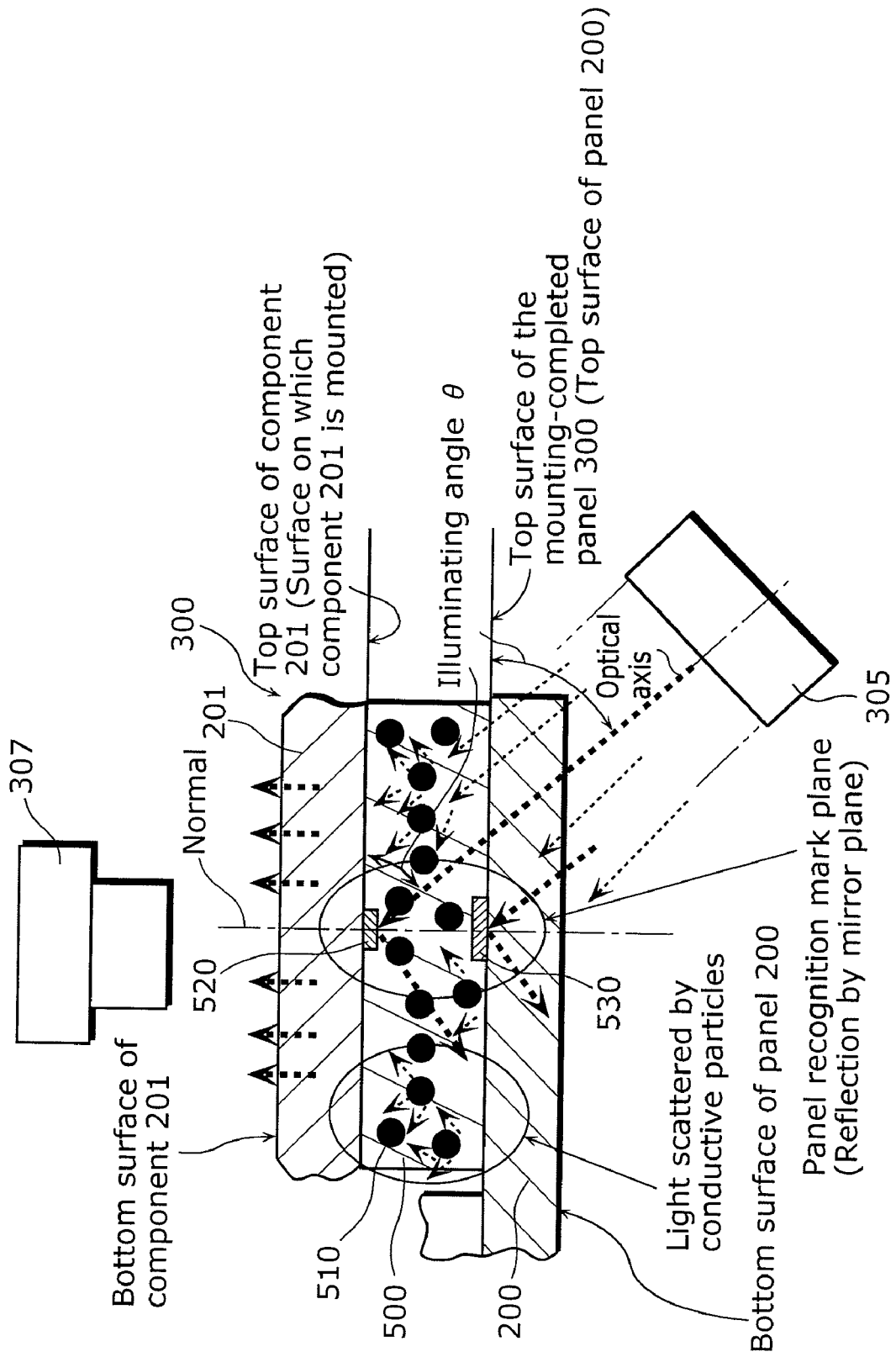
FIG. 4 illustrates a panel recognition mark and a component recognition mark with an infrared light illuminated thereon in the inspector.

As shown in FIG. 4, an optical axis of the infrared light illuminator 305 intersects with the surface of a component recognition mark 520. In addition, the optical axis of the infrared light illuminator 305 (i) is inclined with respect to a normal (the normal found on the surface of the component 201) found on the surfaces of the component recognition mark 520 and the mounting-completed panel 300, and (ii) forms an angle of equal to 45° or greater and smaller than 60° to the surface of the mounting-completed panel 300. When the infrared light illuminator 305 whose optical axis is inclined emits the light to the panel recognition mark 530 and the component recognition mark 520, an optical path length of an infrared light passing through an ACF 500 becomes greater. Thus, the infrared light easily hits conductive particles (ACF particles) 510. Since the conductive particles 510 are spherical, the infrared light from the infrared light illuminator 305 is easily scattered in the ACF 500. When the optical axis of the infrared light illuminator 305 runs in parallel to the normal found on the surface of the mounting-completed panel 300, the infrared light from the infrared light illuminator 305 directly enters the IR camera 307 thanks to the progressiveness of the IR, and forms an image of the component recognition mark 520. Here, the infrared light has a wavelength incapable of or has difficulty in passing through the conductive particles 510. Thus, a part of the image of the component recognition mark 520 where the conductive particles 510 overlap with the component recognition mark 520 is missing due to the conductive particles 510. When the optical axis of the infrared light illuminator 305 is inclined, however, the infrared light scattered by the conductive particles 510 enters the IR camera 307, and forms the image of the component recognition mark 520. As a result, even though the infrared light is incapable of or has difficulty in passing through the conductive particles 510, the particle parts of the conductive particles 510 found in the ACF 500 appear bright enough in the image, and a luminance difference, found in the image, between the particle part and a binder part (a thermosetting resin part) with no conductive particles 510 becomes smaller. Hence, the image has no missing part, of the component recognition mark 520, which could be caused by the conductive particles 510.

Here, the IR camera 307 is provided opposite the infrared light illuminator 305 in relation to the mounting-completed panel 300; that is, the side of the bottom surface (a surface of the component 201 opposite a surface on which the component 201 bonds to the panel 200) of the component 201. The IR camera 307 captures an image of the panel recognition mark 530 and an image of the component recognition mark 520 which are illuminated with the infrared light. The optical axis of the IR camera 307 runs in parallel to the normal (the normal found on the surface of the component 201) found on the surface of the component recognition mark 520 and the surface of the mounting-completed panel 300.

Here, the following materials are chiefly used: components are made of polyimide and Si, the panel 200 is made of glass, the panel recognition mark 530 and the component recognition mark 520 are made of Al, and the surfaces of the conductive particles are formed of Ni.

Figure 5:
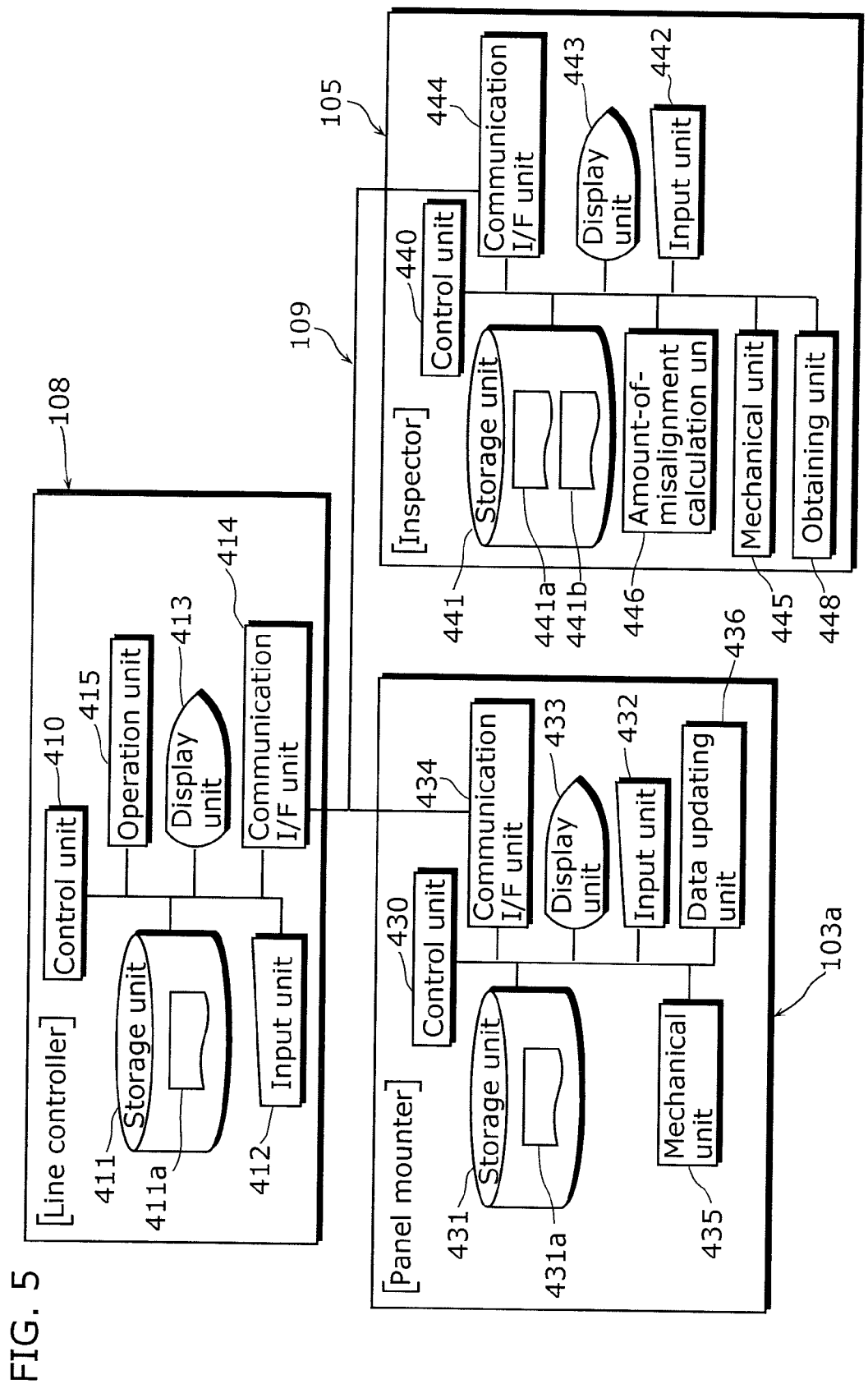
FIG. 5 is a functional block diagram showing a schematic configuration of the component mounting system.

FIG. 5 is a functional block diagram showing a schematic configuration of the component mounting system 100.

The line controller 108 includes a control unit 410, a storage unit 411, an input unit 412, a display unit 413, a communication I/F unit 414, and an operation unit 415.

According to an instruction or the like from an operator, the control unit 410 executes line control data stored in the storage unit 411, and controls each unit based on the execution result.

The storage unit 411 is a hard disk and a memory, for example, and holds line control data, a master table 411a, and so on. The master table 411a contains information indicating an associated pair of a mounting position and an amount of correction (feedback amount).

The input unit 412 is a keyboard and a mouse, for example, and the display unit 413 is a cathode-ray tube (CRT), a liquid crystal display (LCD), and the like. These units are used for communication and so on between the line controller 108 and the operator.

The communication I/F unit 414 is a local area network (LAN) adapter, for example, and is used for communication and so on between: the line controller 108; and the panel mounter 103a and the inspector 105.

The operation unit 415 calculates an amount of correction based on the amount of misalignment, of the component 201, calculated by the inspector 105, and updates the master table 411a stored in the storage unit 411. Here, the component 201 is mounted on the panel 200 of the mounting-completed panel 300.

The panel mounter 103a includes a control unit 430, a storage unit 431, an input unit 432, a display unit 433, a communication I/F unit 434, a mechanical unit 435, and a data updating unit 436.

According to an instruction or the like from the operator, the control unit 430 executes NC data stored in the storage unit 431, and controls each unit based on the execution result.

The storage unit 431 is a hard disk and a memory, for example, and holds NC data and the feedback data 431a. The feedback data 431a includes information indicating a pair of corresponding mounting positions and an amount of correction.

The input unit 432 is a keyboard and a mouse, for example, and the display unit 433 is a CRT, an LCD, and the like. These units are used for communication and so on between the panel mounter 103a and the operator.

The communication I/F unit 434 is a LAN adapter, for example, and is used for communication and so on between the panel mounter 103a and the line controller 108.

The mechanical unit 435 is a set of mechanical units including the thermocompression-bonding heads 202, 204, and 206 of the panel mounter 103*a*, a transfer unit, an arm, an XY table, a component supply unit, a motor which drives these units, and a motor controller, for example.

The data updating unit 436 updates the feedback data 431*a* stored in the storage unit 431 based on the master table 411*a* transmitted by the line controller 108.

The inspector 105 includes a control unit 440, a storage unit 441, an input unit 442, a display unit 443, a communication I/F unit 444, a mechanical unit 445, an amount-of-misalignment calculation unit 446, and an obtaining unit 448.

According to an instruction or the like from the operator, the control unit 440 executes NC data stored in the storage unit 441, and controls each unit based on the execution result.

The storage unit 441 is a hard disk and a memory, for example, and holds NC data, inspection position data 441*a*, feature point data 441*b*, and so on. The inspection position data 441*a* is a set of information indicating all positions to be inspected by the inspector 105. The feature point data 441*b* is information about feature points of the panel recognition mark 530 and the component recognition mark 520.

The input unit 442 is a keyboard and a mouse, for example, and the display unit 443 is a CRT, an LCD, and the like. These units are used for communication and so on between the inspector 105 and the operator.

The communication I/F unit 444 is a LAN adapter, for example, and is used for communication and so on between the inspector 105 and the line controller 108.

The mechanical unit 445 is a set of mechanical units including the panel transfer stage unit 302 of the inspector 105, the under-panel transfer shaft unit 303, the infrared light illuminator 305, the IR camera 307, a motor which drives these components, and a motor controller, for example.

The amount-of-misalignment calculation unit 446 is an example of a calculation unit of the present invention, and calculates an amount of misalignment, of the panel recognition mark 530 and the component recognition mark 520 in the images captured by the IR camera 307, from a predetermined mounting positional relationship when the component 201 is mounted on the panel 200. To be more specific, the amount-of-misalignment calculation unit 446 calculates an amount of misalignment out of the images captured by the IR camera 307. Here, the amount of misalignment is found between a predetermined position that is determined using, as a reference, the position of a feature point of the panel recognition mark 530 and a position of a predetermined feature point of the component recognition mark 520.

The obtaining unit 448 obtains, from the images captured by the IR camera 307, the position of the predetermined feature point of the panel recognition mark 530 and the position of the predetermined feature point of the component recognition mark 520.

Figure 6:
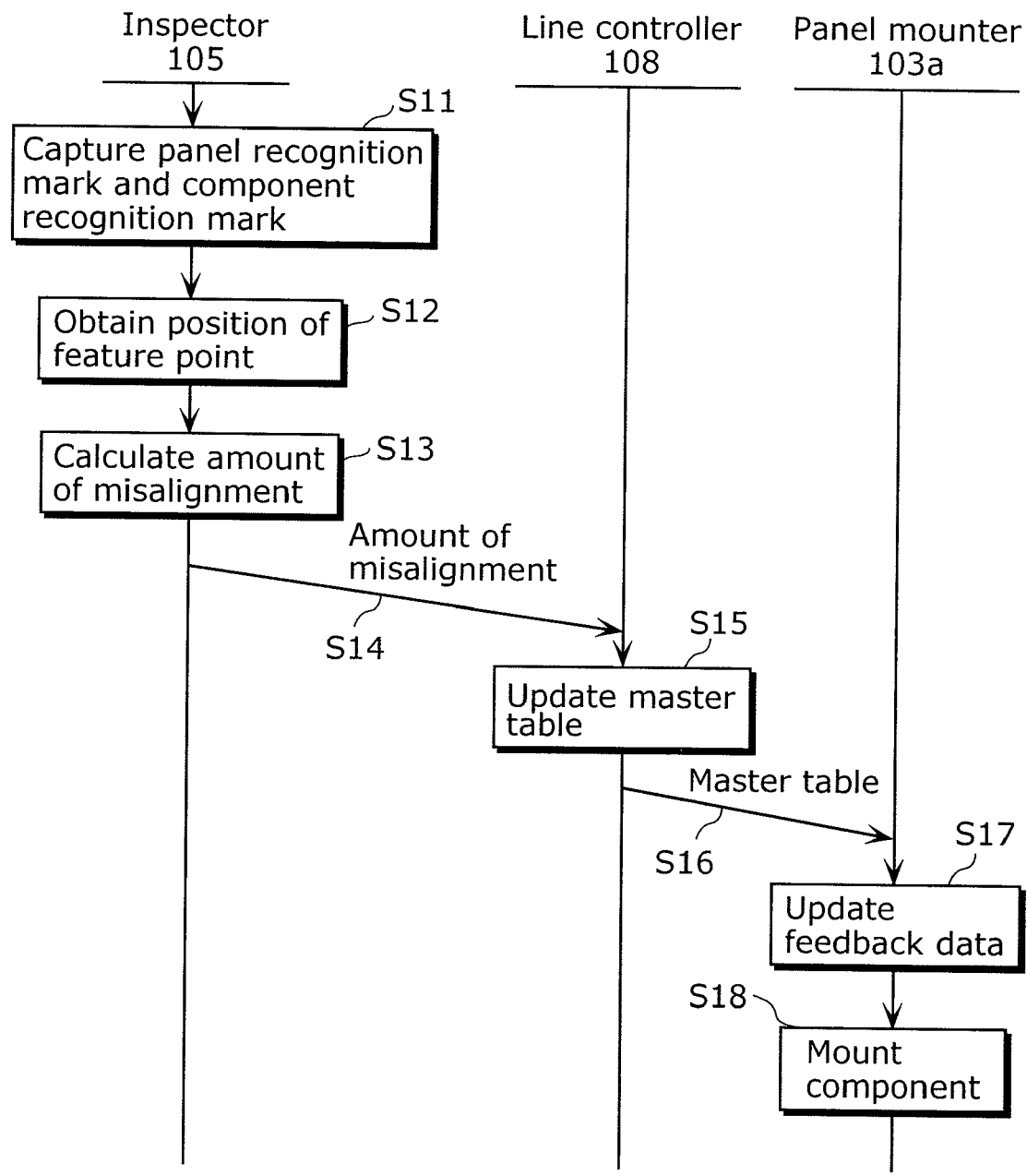
FIG. 6 shows a sequence of a feedback operation performed by the component mounting system.

Next, a feedback operation (providing feedback of an amount of misalignment of the component 201 for the component mounting) performed by the component mounting system 100 is described in detail. FIG. 6 shows a sequence of the feedback operation performed by the component mounting system 100.

First, the control unit 440 of the inspector 105 causes the mechanical unit 445 to capture a pair of images of the panel recognition mark 530 and the component recognition mark 520 both included in the mounting-completed panel 300 (Step S11). To be more specific, the infrared light illuminator 305 illuminates with the infrared light the panel recognition mark 530 and the component recognition mark 520 both formed in one of the positions indicated in the inspection position data 441*a*. Here, the infrared light is emitted at the side of the bottom surface (the surface opposite the surface of the panel 200 on which the component 201 is mounted) of the mounting-completed panel 300. Then, the IR camera 307 captures the images of the panel recognition mark 530 and the component recognition mark 520 at the side of the top surface (a surface of the panel 200 on which the component 201 is mounted) of the mounting-completed panel 300.

Next, the control unit 440 of the inspector 105 causes the obtaining unit 448 to obtain the positions of the respective feature points of the panel recognition mark 530 and the component recognition mark 520 (Step S12).

Figure 7:
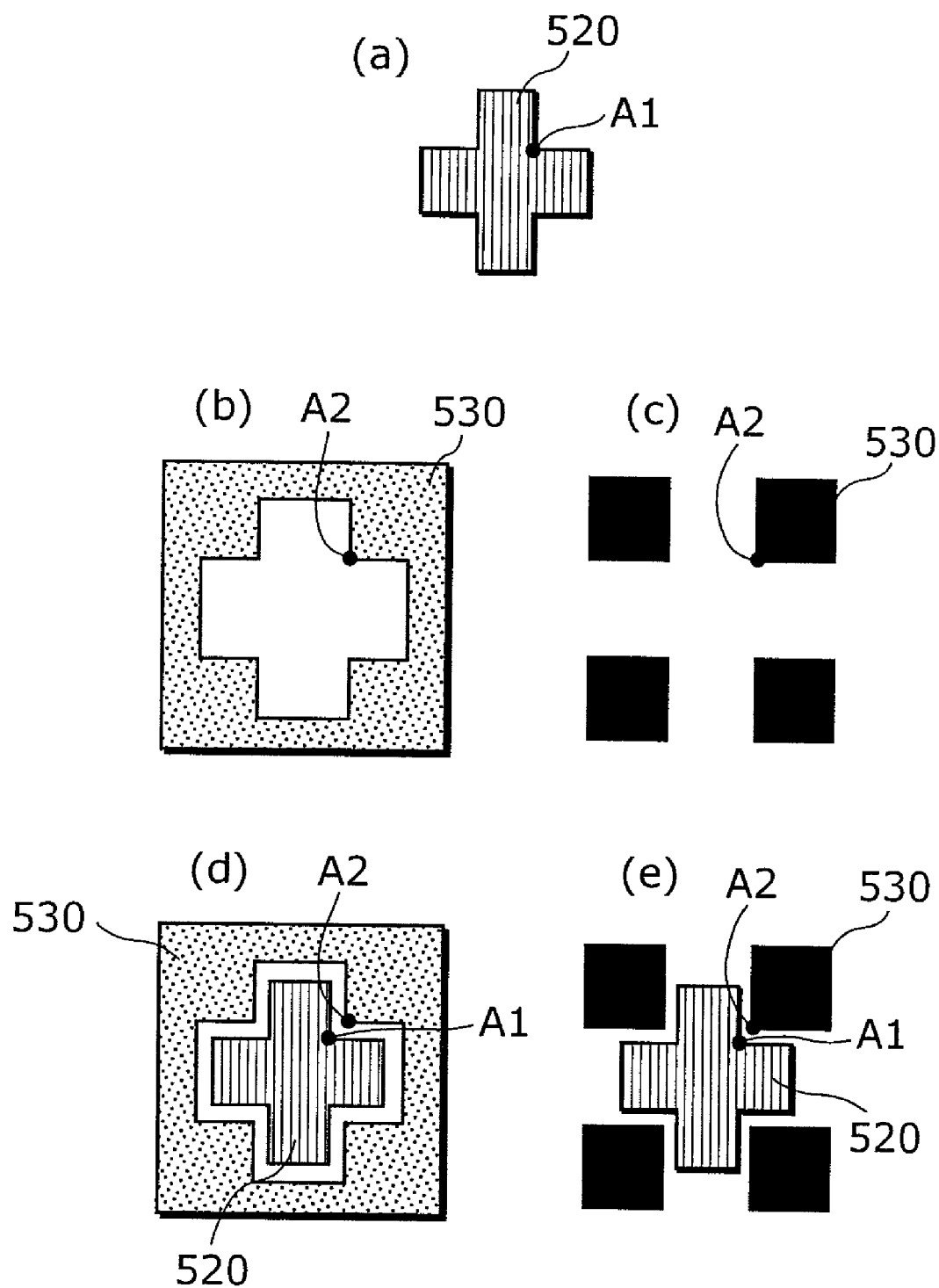
FIG. 7(a) shows an example of a component recognition mark.
FIG. 7(b) shows an example of a panel recognition mark.
FIG. 7(c) shows an example of a panel recognition mark.
FIG. 7(d) shows an example of a component recognition mark and a panel recognition mark.
FIG. 7(e) shows an example of a component recognition mark and a panel recognition mark.

An example positional relationship between the component recognition mark 520 and the panel recognition mark 530 is obtained as described below. The component recognition mark 520 shown in FIG. 7(*a*) is formed on the top surface (a surface of the component 201 facing a surface of the panel 200 on which the component 201 is mounted) of the component 201. The panel recognition mark 530 shown in FIG. 7(*b*) and FIG. 7(*c*) is formed on the top surface (a surface of the panel 200 on which the component 201 is mounted) of the panel 200. When the component 201 is mounted on the panel 200 at a predetermined mounting position, the positional relationship between the component recognition mark 520 and the panel recognition mark 530 is provided as shown in FIGS. 7(*d*) and 7(*e*). Assumed here is that edges (corners); namely A1 and A2, are indicated in the feature point data 441*b* as feature points. A1 and A2 are intersections of straight lines forming outlines of each of the component recognition mark 520 and the panel recognition mark 530. The obtaining unit 448 obtains the positions of the edges A1 and A2.

Figure 8:
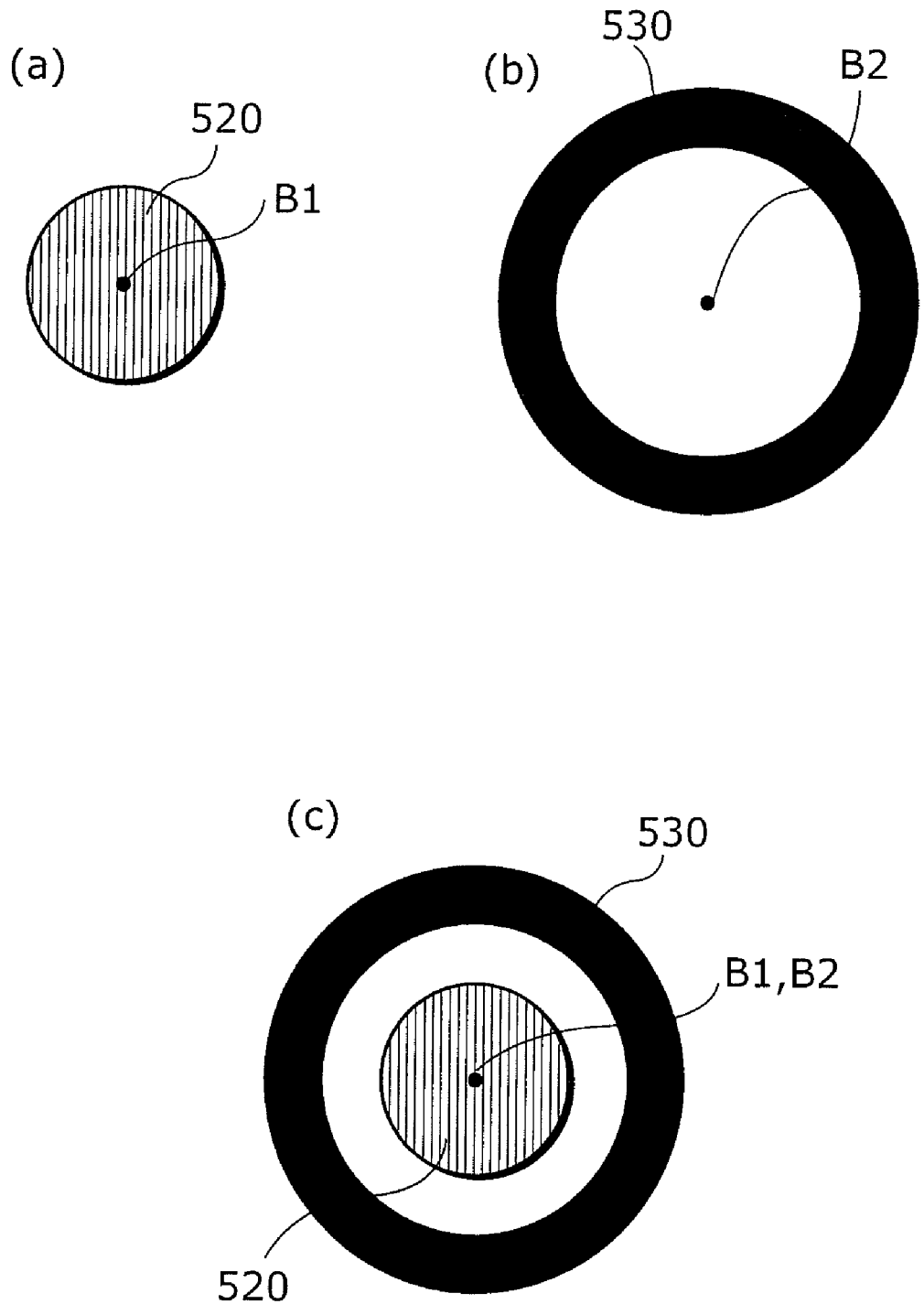
FIG. 8(a) shows an example of a component recognition mark.
FIG. 8(b) shows an example of a panel recognition mark.
FIG. 8(c) shows an example of a component recognition mark and a panel recognition mark.

Additionally, another assumed positional relationship between the component recognition mark 520 and the panel recognition mark 530 is obtained as described below. The component recognition mark 520 shown in FIG. 8(*a*) is formed on the top surface (the surface of the component 201 facing the surface of the panel 200 on which the component 201 is mounted) of the component 201. The panel recognition mark 530 shown in FIG. 8(*b*) is formed on the top surface (the surface of the panel 200 on which the component 201 is mounted) of the panel 200. When the component 201 is mounted on the panel 200 at a predetermined mounting position, the positional relationship between the component recognition mark 520 and the panel recognition mark 530 is provided as shown in FIG. 8(*c*). In this case, assumed here is that the feature point data 441*b* indicates, as feature points, the center of gravity B1 of a circle constituting the component recognition mark 520 and the center of gravity B2 of a circle constituting the panel recognition mark 530. The obtaining unit 448 obtains the positions of the centers of gravity B1 and B2.

Next, the control unit 440 of the inspector 105 causes the amount-of-misalignment calculation unit 446 to calculate, as an amount of misalignment representing an amount of misalignment of the mounting position of the mounted component 201, an amount of misalignment of a position of the predetermined feature point of the component recognition mark 520 from a predetermined position that is determined using the position of the feature point of the panel recognition mark 530 as a reference (Step S13). To be more specific, the control unit 440 causes the amount-of-misalignment calculation unit 446 to calculate (i) a position of the predetermined feature point of the component recognition mark 520 using the position of the predetermined feature point of the panel recognition mark 530 as a reference, and (ii) the amount of misalignment found between the calculated position of the predetermined feature point of the component recognition mark 520 and the predetermined position using the position of the predetermined feature point of the panel recognition mark 530 as a reference.

Next, the control unit 440 of the inspector 105 causes the communication I/F unit 444 to transmit to the line controller 108 the calculated amount of misalignment of the component 201 in association with a mounting position indicated in the inspection position data 441a (Step S14).

Next, the control unit 410 of the line controller 108 causes the operation unit 415 to update the master table 411a stored in the storage unit 441 based on the amount of misalignment received via the communication I/F unit 414 (Step S15).

Next, the control unit 410 of the line controller 108 causes the communication I/F unit 414 to transmit the updated master table 411a to the panel mounter 103a (Step 16).

Next, the control unit 430 of the panel mounter 103a updates the feedback data 431a stored in the storage unit 431 based on the master table 411a received via the communication I/F unit 434 (Step 17).

Lastly, the control unit 430 of the panel mounter 103a executes the NC data and causes the mechanical unit 435 to mount the component 201 on the panel 200 (Step S18). The mounting involves correcting the mounting position of the component 201 with the updated feedback data 431a taken into account, and mounting the component 201 at the corrected mounting position via the ACF 500.

As described above, the inspector 105 according to the Embodiment calculates an amount of misalignment of component 201 based on the image of the panel recognition mark 530 and the image of the component recognition mark 520. This makes it possible to precisely detect the amount of misalignment of the component 201 mounted on the panel 200 via the panel through the ACF.

In the inspector 105 according to Embodiment, the optical axis of the infrared light illuminator 305 (i) is inclined with respect to the normal found on the surface of the mounting-completed panel 300, and (ii) forms an angle of equal to 45° or greater and smaller than 60° to the surfaces of the mounting-completed panel 300 or the component 201. This structure makes possible (i) capturing the component recognition mark 520 with less influence of the conductive particles 510 and calculating the amount of misalignment of the component 201, and (ii) reliably detecting the amount of misalignment of the component 201 mounted on the panel 200 through the ACF 500.

Assume that the optical axis of the infrared light illuminator 305 runs in parallel to the normal of the surface of the mounting-completed panel 300. Since the infrared light has a wavelength which is unable or difficult to pass through the conductive particles 510, the outlines of the panel recognition mark 530 and the component recognition mark 520 are unclear due to the effect that the conductive particles 510 are non-transparent to the infrared light, as shown in FIG. 9(a). As a result, obtained images have unrecognizable feature points. With the optical axis of the infrared light illuminator 305 inclined with respect to the normal of the surface of the mounting-completed panel 300, however, the obtained images are free from the influence of the conductive particles 510 as shown in FIG. 9(b): the obtained images have (i) clear outlines of the panel recognition mark 530 and the component recognition mark 520, and (ii) recognizable feature points.

Figure 10:
FIG. 10 shows a relationship between an illuminating angle and an assessment result of an image.
Figure 11B:
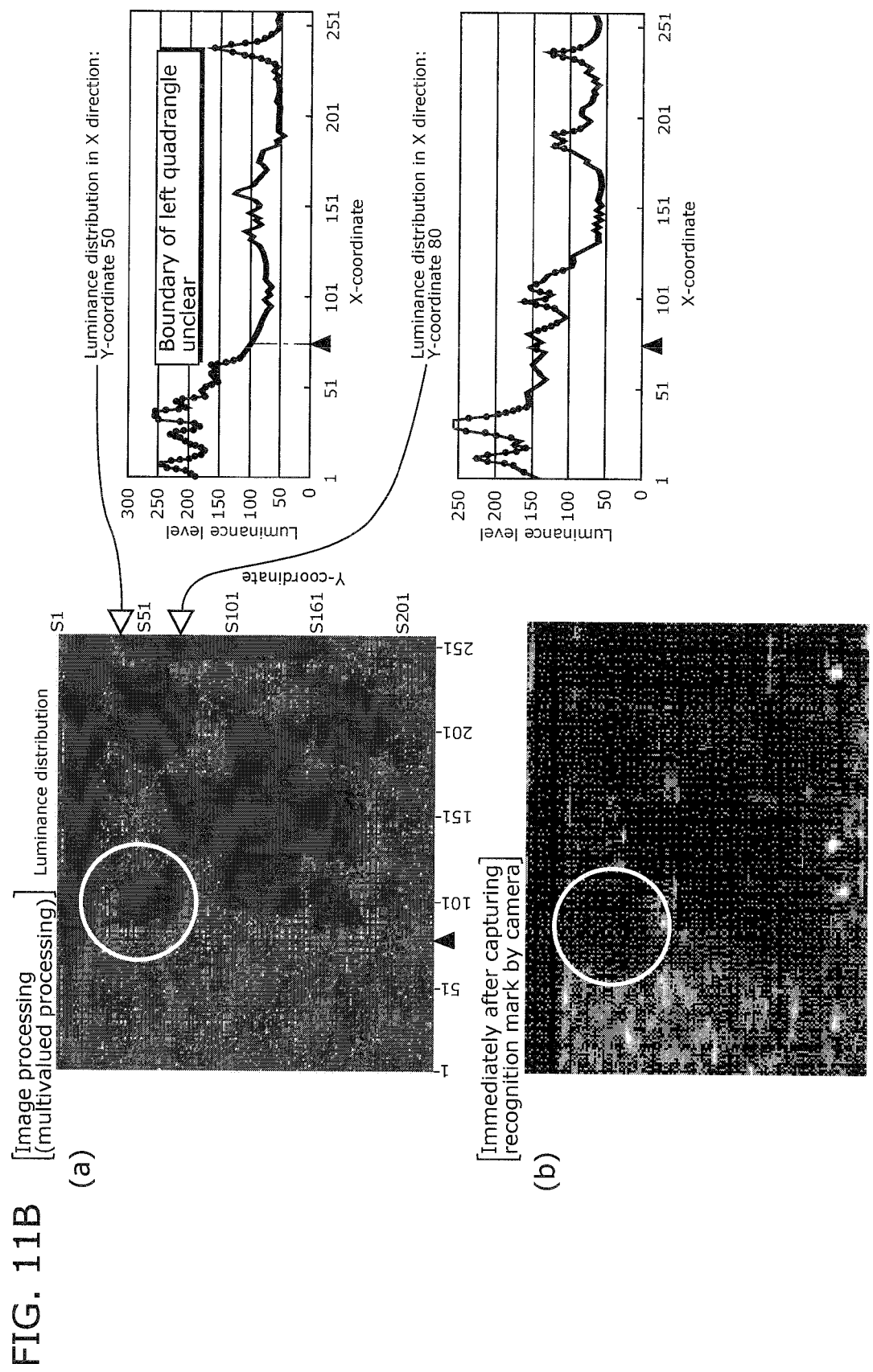
FIG. 11B (a) and (b) in FIG. 11B exemplifies a mark image.
Figure 11C:
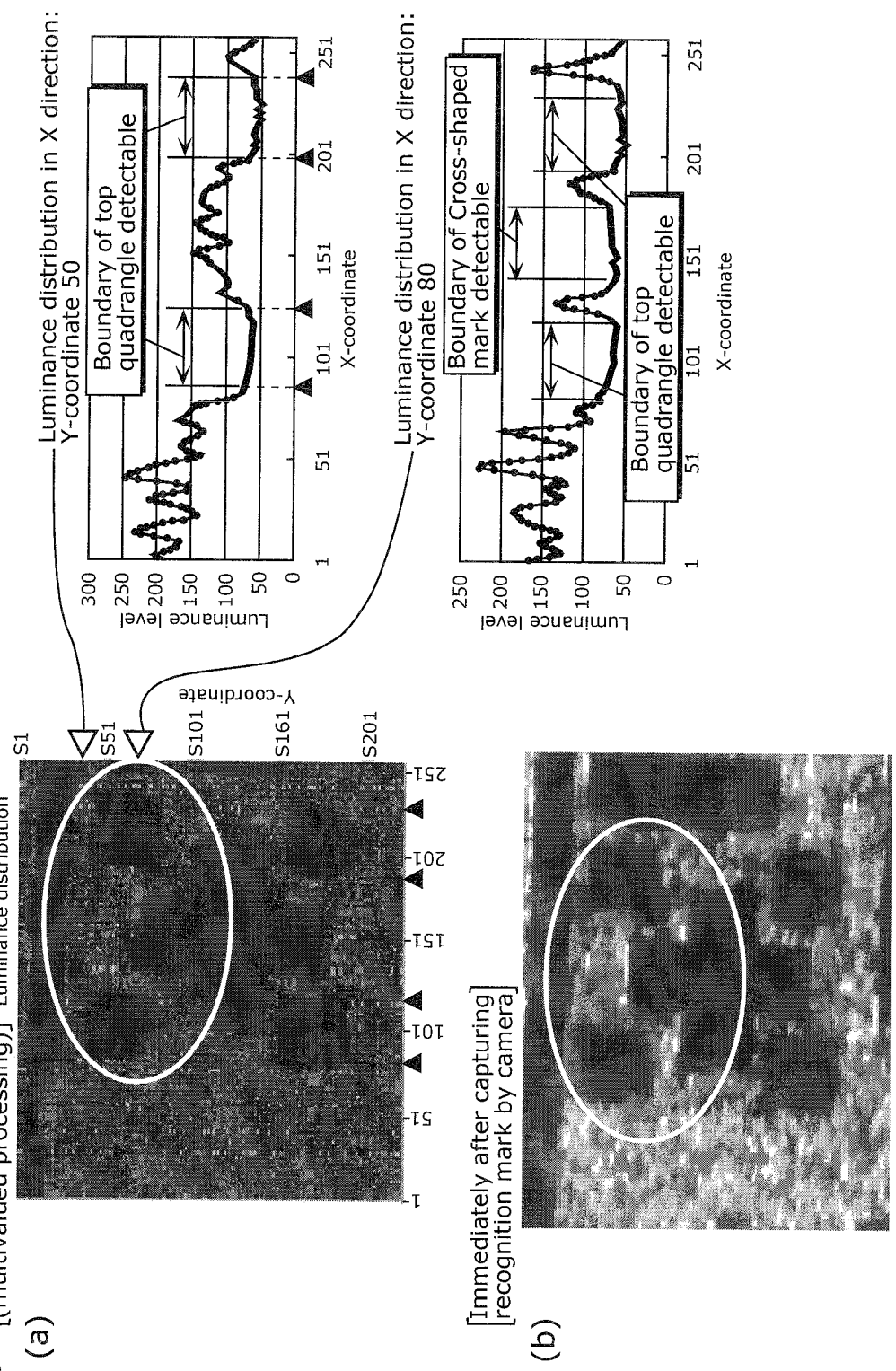
FIG. 11C exemplify a mark image.

FIGS. 10 and 11(A) clearly show the above. FIG. 10 shows a relationship between an angle (illuminating angle) and an assessment result (an assessment result of images). The angle is formed between (i) the optical axis of the infrared light illuminator 305 and (ii) the surfaces of the mounting-completed panel 300 or the component 201. The assessment result shows whether or not the images of the panel recognition mark 530 and the component recognition mark 520 have clear outlines and therefore recognizable. FIG. 11A shows a relationship between an illuminating angle, an assessment result of images, and combined images of the panel recognition mark 530 and the component recognition mark 520 (mark image). The symbol "○" of the assessment result of images denotes that the outlines of the images of the panel recognition mark 530 and the component recognition mark 520 are clear and recognizable, and the symbol "X" denotes that those are not clear or recognizable. According to FIGS. 10 and 11A, the illuminating angle of equal to 45° or greater and smaller than 60° makes the outlines of the mark image clear and recognizable. When the illuminating angle is at 40°, for example, obtained is only a mark image having unclear outlines, as shown in FIG. 11B. In a graph showing the result of image processing (multivalued processing), the boundary of a changing point of a luminance level of a recognition mark with respect to X-coordinate is unclear. Thus, it is difficult to detect the boundary of the recognition mark. When the illuminating angle is at 50°, concurrently, obtained is a recognizable mark image having clear outlines, as shown in FIG. 11C. In a graph showing the result of image processing (multivalued processing), the boundary of a changing point of a luminance level of a recognition mark with respect to X-coordinate is clear. This makes possible detecting the boundary of the recognition mark and recognizing the position of the recognition mark.

Figure 12:
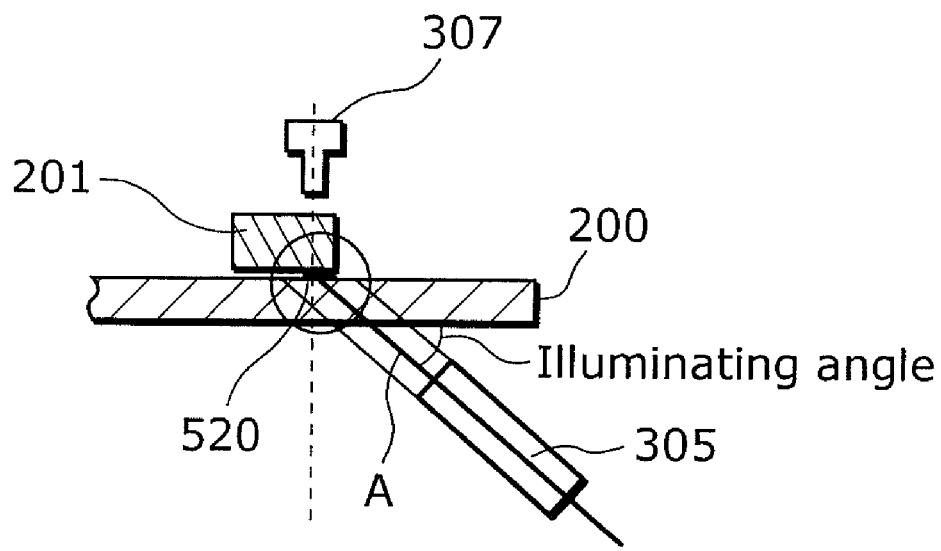
FIG. 12 illustrates the component recognition mark with an infrared light illuminated thereon in the inspector.

In the inspector 105 according to Embodiment, the infrared light illuminator 305 is placed so that the optical axis thereof (an axis "A" in FIG. 12) intersects with the surface of the component recognition mark 520 as shown in FIG. 12. Accordingly, the infrared light illuminator 305 can directly illuminates the component recognition mark 520 with the infrared light. This eliminates the need for increasing an amount of the light coming from the infrared light illuminator 305, and achieves lower power consumption.

Thus far, the inspection apparatus and the inspection method according to the present invention have been described above based on Embodiment, but the present invention is not limited to Embodiment. The present invention includes various modifications obvious to a person skilled in the art without departing from the scope of the present invention.

For example, Embodiment has illustrated that the inspector is provided in the line. However, the panel mounters 103a and 103b may have a function of inspecting the mounting-completed panel 300. Here, the panel mounters 103a and 103b include the infrared light illuminator 305 and the IR camera 307. The infrared light illuminator 305 and the IR camera 307 are provided in a positional relationship similar to that found in the inspector 105 in relation to the mounting-completed panel 300.

Embodiment has also illustrated that the inspector 105 includes the infrared light illuminator 305 and the IR camera 307 in order to capture images of the panel recognition mark 530 and the component recognition mark 520. However, employed may be any illuminator and any camera other than the above illuminator and camera as far as: (i) the illuminator emits a light which can be used for capturing images of the panel recognition mark 530 and the component recognition mark 520; that is, the light having a wavelength which allows the light to pass through the panel 200 and the component 201 but does not allow or does not easily allow the light to pass through the conductive particles 510; and (ii) the camera can receive the light.

In addition, above Embodiment has illustrated that the obtaining unit 448 obtains the position of one feature point from each of the panel recognition mark 530 and the component recognition mark 520. However, the obtaining unit 448 may obtain the positions of two feature points. This makes it possible also to calculate, as the amount of misalignment of the component 201, an amount of shift in the slope of a straight line connecting the two feature points and an amount of misalignment of the respective centers of the two feature points, thereby allowing more precise detection of the amount of misalignment of the component 201 mounted on the panel 200 through the ACF 500.

Further, above Embodiment has illustrated that the inspector 105 calculates, using the panel recognition mark 530 as a reference, the amount of misalignment of the component recognition mark 520 as the amount of misalignment of the component 201. However, the inspector 105 may calculate, using a wiring pattern of the panel 200 as a reference, the amount of misalignment occurring between the wiring pattern of the panel 200 and a wiring pattern of the component 201 or a circuit pattern of the component 201 as the amount of misalignment of the component 201.

Figure 13:
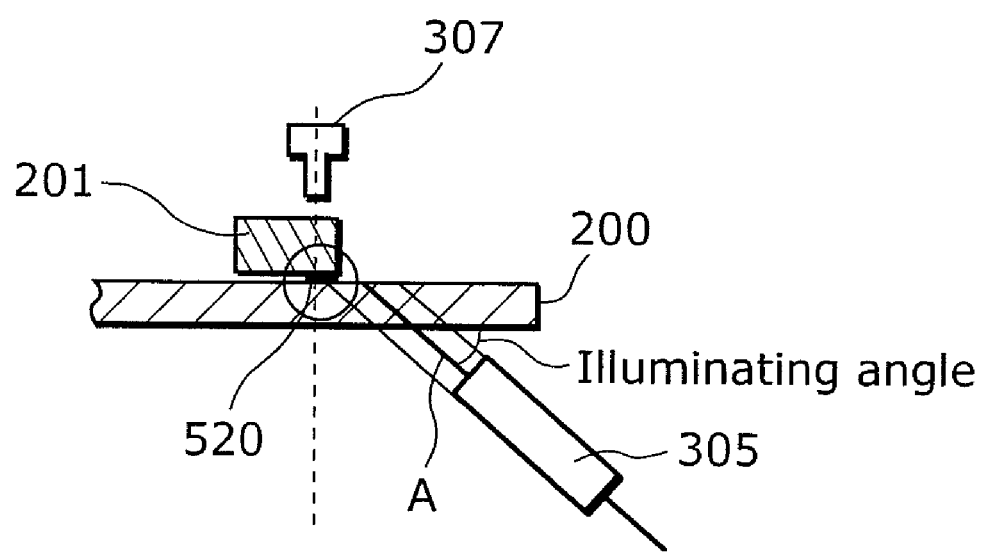
FIG. 13 illustrates the component recognition mark with an infrared light illuminated thereon in the inspector.
Figure 14:
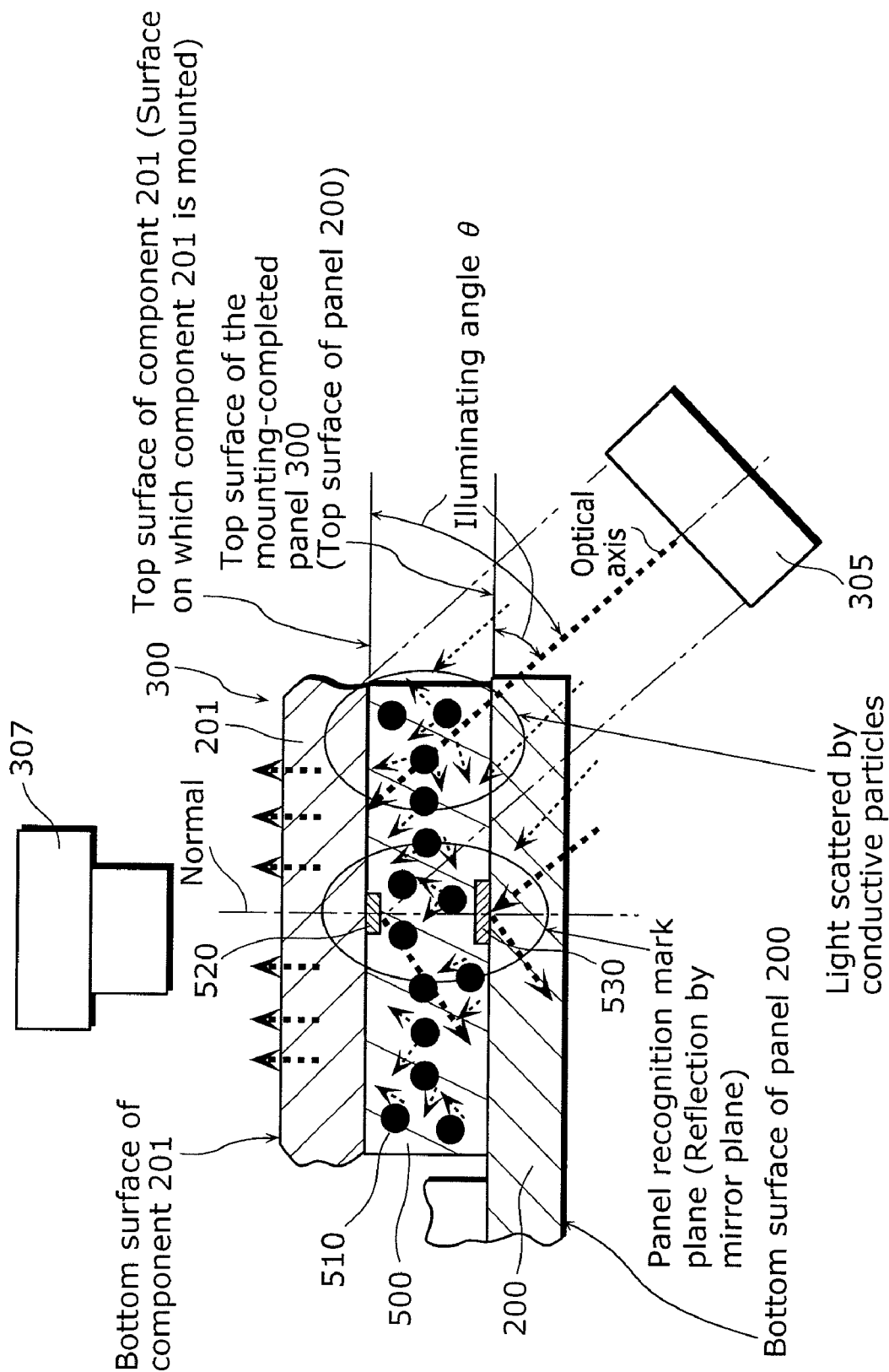
FIG. 14 illustrates the panel recognition mark and the component recognition mark with an infrared light illuminated thereon in the inspector.

Moreover, above Embodiment has illustrated as shown in FIG. 12 that the infrared light illuminator 305 is provided so that the optical axis thereof intersects with the surface of the component recognition mark 520. However, as shown in FIGS. 13 and 14, the infrared light illuminator 305 may be provided so that the optical axis thereof (an axis "A" in FIG. 13) does not intersect with the surface of the component recognition mark 520. Here, the infrared light illuminator 305 is provided so that the optical axis thereof forms an angle of equal to 50° or greater and smaller than 85° with the surface of the component recognition mark 520; namely the surface (a surface which is substantially in parallel to the surface of the component 201) of the mounting-completed panel 300. This structure makes possible obtaining an image having (i) a less influence of the conductive particles 510 which are non-transparent to the infrared light, (ii) clear outlines of the panel recognition mark 530 and the component recognition mark 520, and (iii) a recognizable feature point. Furthermore, compared with the disposition of the infrared light illuminator 305 shown in FIG. 12, the dispositions shown in FIGS. 13 and 14 allow a clear image, which is recognizable for position recognition, to be obtained with a wider range of angles; namely, equal to 50° or greater and smaller than 85°. This structure allows the inspection apparatus to be designed more freely.

Figure 15:
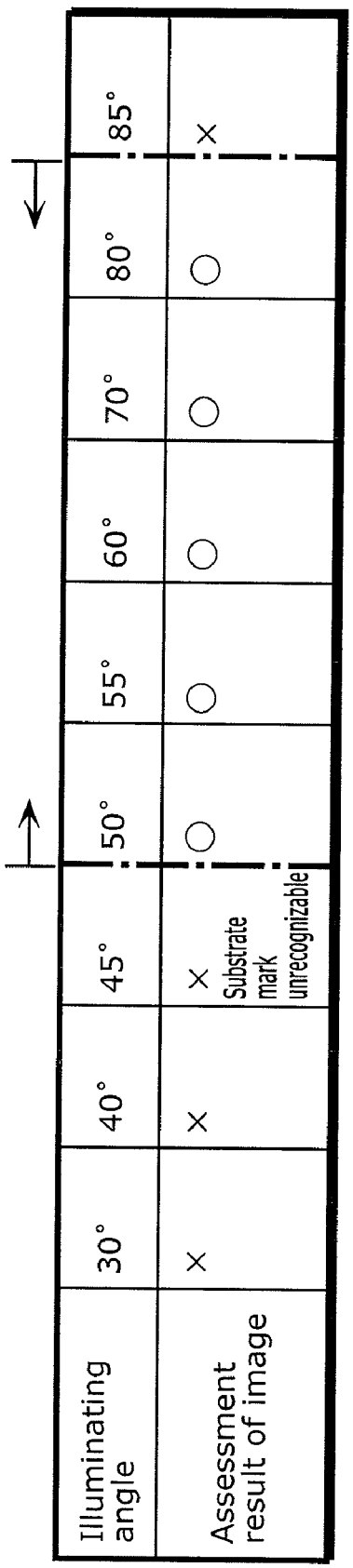
FIG. 15 shows a relationship between an illuminating angle and an assessment result of an image.
Figure 17:
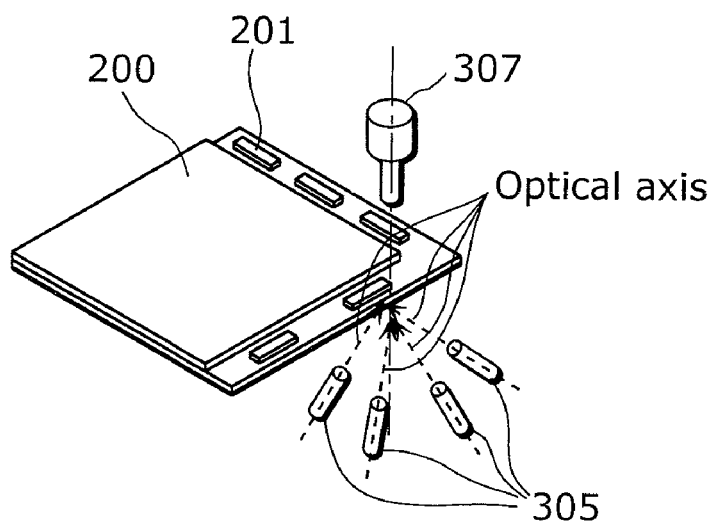
FIG. 17 shows how an inspector of the component mounting system inspects a mounting-completed panel.
Figure 18:
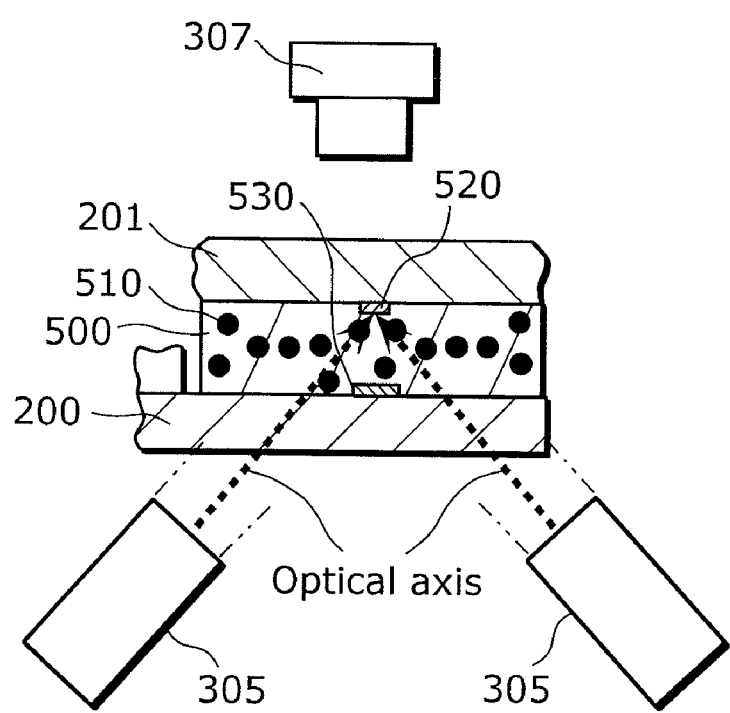
FIG. 18 illustrates the panel recognition mark and the component recognition mark with an infrared light illuminated thereon in the inspector.
Figure 19:
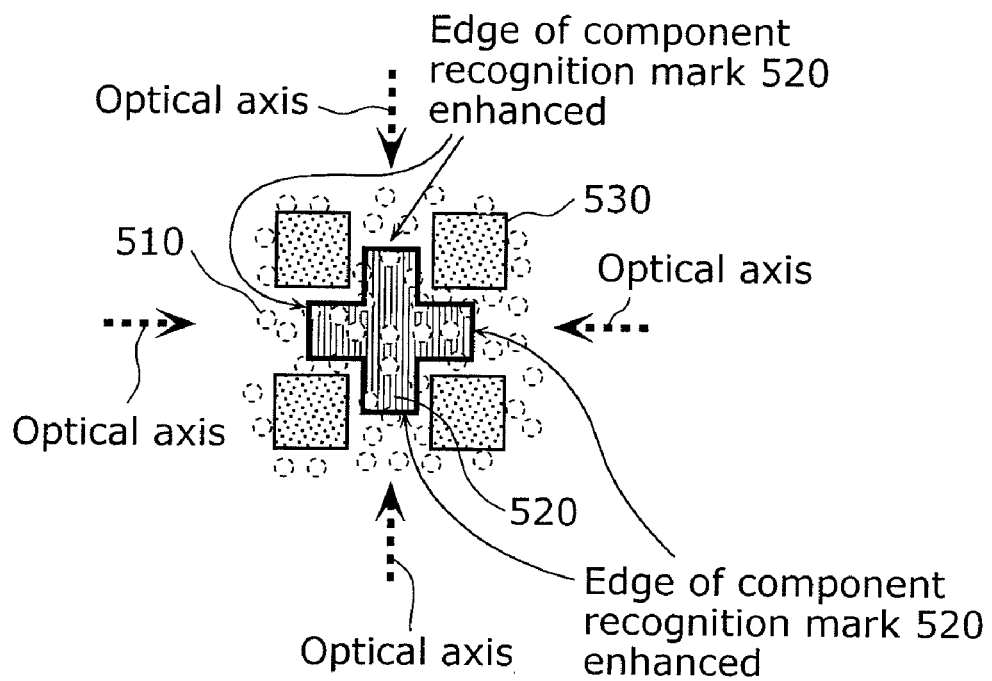
FIG. 19 shows an example of an image captured by an IR camera.
Figure 20:
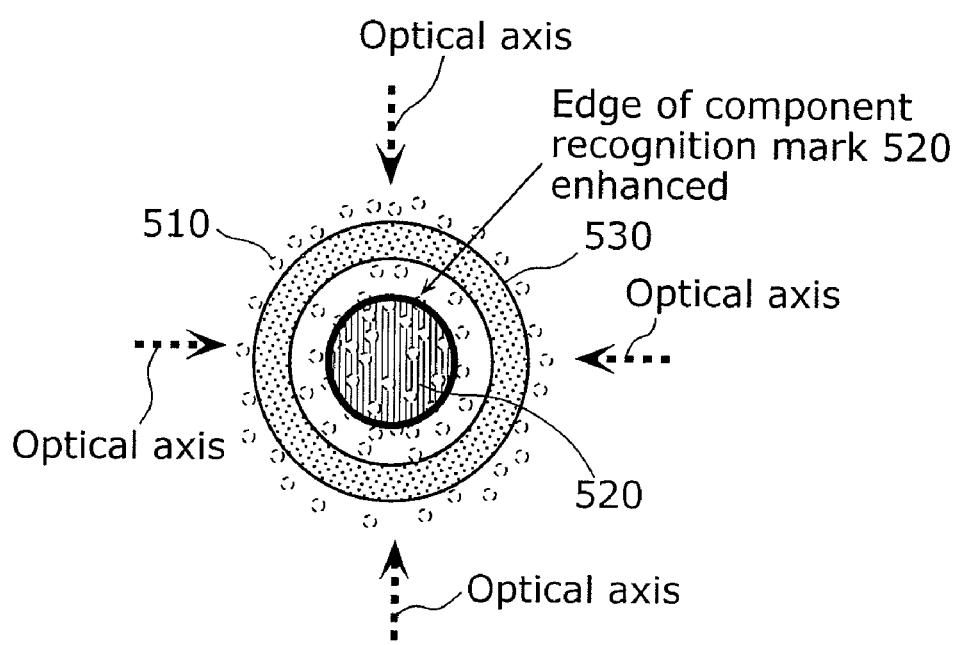
FIG. 20 shows an example of an image captured by an IR camera.

FIGS. 15 and 16 clearly show the above. FIG. 15 shows a relationship between an illuminating angle and an assessment result of images when the infrared light illuminator 305 is provided in a positional relationship shown in FIGS. 13 and 14. FIG. 16 shows a relationship between an illuminating angle, an assessment result of images, and mark images of the panel recognition mark 530 and the component recognition mark 520 when the infrared light illuminator 305 is provided as shown in FIGS. 13 and 14. The symbol "○" of the assessment result of images denotes that the outlines of the images of the panel recognition mark 530 and the component recognition mark 520 are clear and recognizable, and the symbol "X" denotes that those are not clear or recognizable. According to FIGS. 15 and 16, the illuminating angle of equal to 50° or greater and smaller than 85° makes the outlines of the mark images clear and recognizable. Moreover, above Embodiment has illustrated that the inspector 105 has only one infrared light illuminator 305. However, as shown in FIGS. 17 and 18, the inspector 105 may have two or more infrared light illuminators 305 illuminate the panel recognition mark 530 and the component recognition mark 520 at different directions. For example, four of the infrared light illuminators 305 are provided in order to obtain an image having an enhanced edge of the component recognition mark 520, as shown in FIG. 19. The four infrared light illuminators 305 are provided so that the optical axes of the four infrared light illuminators 305 are perpendicular to straight lines forming outlines of the component recognition mark 520 on an image captured by the IR camera 307. The four infrared light illuminators 305 are also provided in order to obtain an image having an enhanced edge (boundary of an outline of the recognition mark) of the component recognition mark 520 formed in a circle, as shown in FIG. 20.

Furthermore, above Embodiment has illustrated that the infrared light illuminator 305 is provided at the side of the bottom surface of the panel 200, and the IR camera 307 is provided at the side of the bottom surface of the component 201. However, the dispositions of the infrared light illuminator 305 and the IR camera 307 shall not be limited to the above as far as the infrared light illuminator 305 and the IR camera 307 face each other and positioned on opposite sides of the mounting-completed panel 300. The IR camera 307 may be provided on the side of the bottom surface of the panel 200, and the infrared light illuminator 305 may be provided on the side of the bottom surface of the component 201. In this case, the optical axis of the infrared light illuminator 305 (i) intersects with the surface of the panel recognition mark 530, (ii) is inclined with respect to the surface of the panel recognition mark 530; that is the normal (normal found on the surface of the panel 200) found on the surface of the mounting-completed panel 300, and (iii) forms an angle of equal to 45° or greater and smaller than 60° with the surface of the mounting-completed panel 300. The optical axis of the infrared light illuminator 305 (i) may not intersect with the surface of the panel recognition mark 530, (ii) is inclined with respect to the normal found on the surface of the mounting-completed panel 300, and (iii) forms an angle of equal to 50° or greater and smaller than 85° with the surface of the mounting-completed panel 300.

Figure 21:
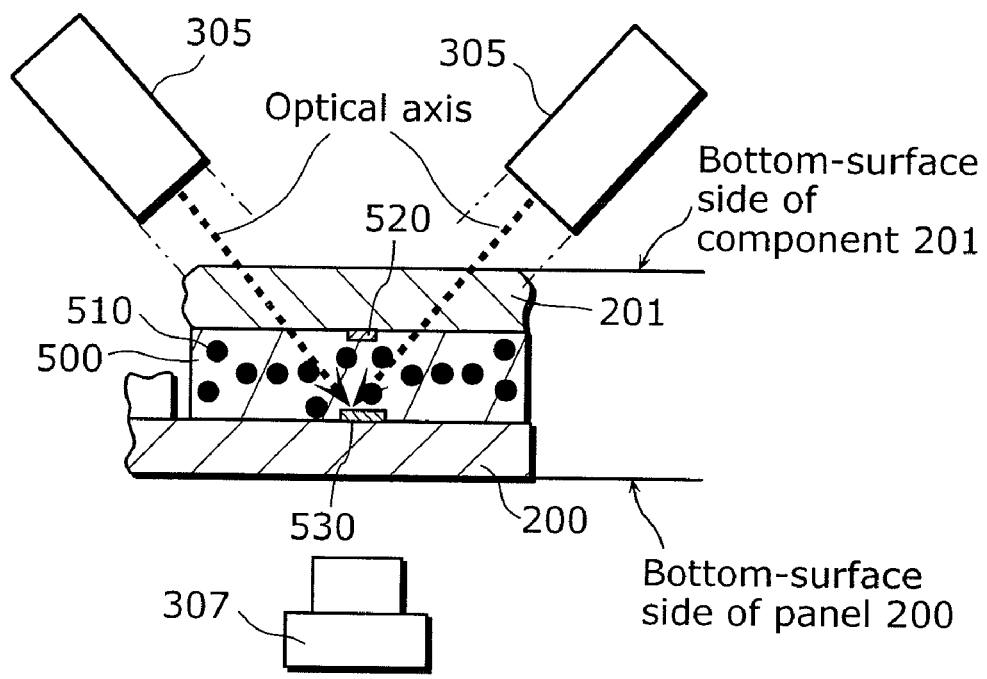
FIG. 21 illustrates the panel recognition mark and the component recognition mark with an infrared light illuminated thereon in the inspector.
Figure 22:
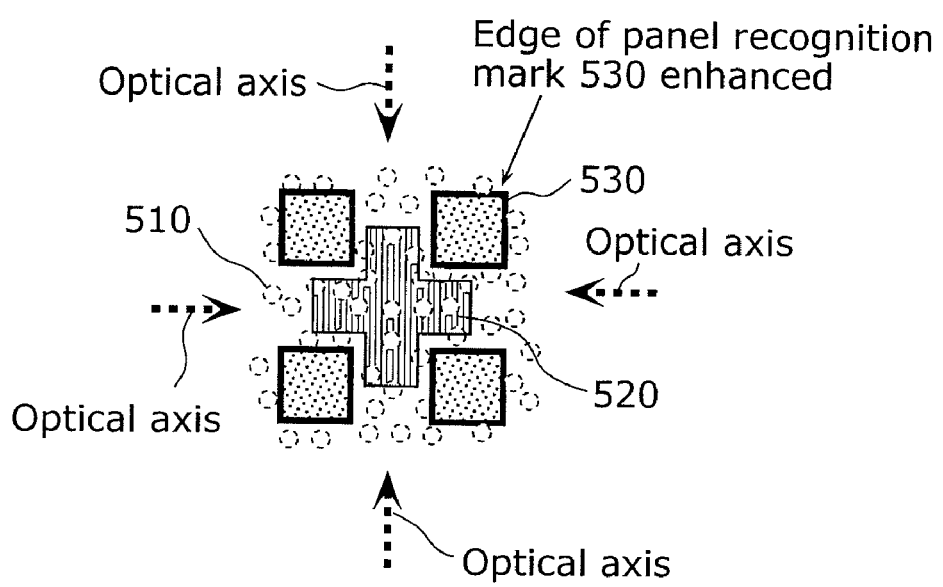
FIG. 22 shows an example of an image captured by an IR camera.

As shown in FIG. 21, for example, two or more infrared light illuminators 305 illuminating the panel recognition mark 530 and the component recognition mark 520 at different directions are provided on the side of the bottom-surface of the component 201. The IR camera 307 is provided on the side of the bottom surface of the panel 200. The two or more infrared light illuminators 305 are provided in order to obtain an image having an enhanced edge of the panel recognition mark 530 shown in FIG. 22. The four infrared light illuminators 305 are provided so that the axes thereof are perpendicular to straight lines forming outlines of the panel recognition mark 530 on an image captured by the IR camera 307.

Figure 23:
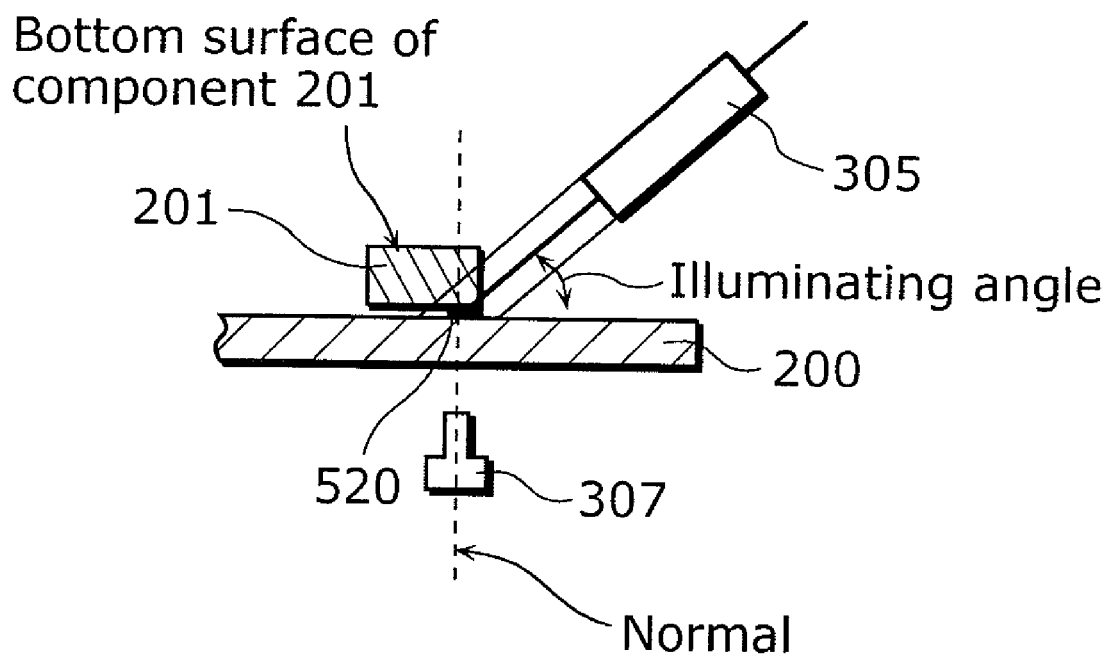
FIG. 23 illustrates the component recognition mark with an infrared light illuminated thereon in the inspector.

In the case where the infrared light illuminator 305 is provided so that the bottom surface of the component 201 is kept from being illuminated with the infrared light, as shown in FIG. 23, reduced is an adverse effect of a scratch found on the bottom surface of the component 201 on the images of the panel recognition mark 530 and the component recognition mark 520.

INDUSTRIAL APPLICABILITY

The present invention can be applied to inspection apparatuses and inspection methods, and particularly to component mounting systems and the like which mount components on panels.

The invention claimed is:
1. An inspection apparatus which detects an amount of misalignment, from a predetermined mounting position, of a component mounted on a surface of a panel through an adhesive which contains conductive particles, said inspection apparatus comprising:

an illuminating unit configured to illuminate with a light a panel recognition mark and a component recognition mark, the panel recognition mark being formed on the surface of the panel, and the component recognition mark being formed on a surface of the component which faces the surface of the panel on which the component is mounted;

a camera which is provided opposite said illuminating unit in relation to the panel, and captures an image of the panel recognition mark and an image of the component recognition mark which are illuminated with the light; and a calculation unit configured to calculate, using the images captured by said camera, an amount of misalignment in a positional relationship between the panel recognition mark and the component recognition mark from a predetermined positional relationship, wherein said illuminating unit emits a light having a wavelength that allows the light to pass through the panel and the component but inhibits passage of the light through the conductive particles, and an optical axis of said illuminating unit is inclined with respect to a normal found on the surfaces of the panel or the component.

2. The inspection apparatus according to claim 1,
wherein the optical axis of said illuminating unit intersects with the panel recognition mark or the component recognition mark.

3. The inspection apparatus according to claim 2,
wherein the optical axis of said illuminating unit forms an angle of equal to 45° or greater and smaller than 60° with the surfaces of the panel or the component.

4. The inspection apparatus according to claim 3,
wherein said illuminating unit is provided on a side of a bottom surface of the panel opposite a surface of the panel on which the component is mounted, and
the optical axis of said illuminating unit intersects with the component recognition mark, and forms the angle of equal to 45° or greater and smaller than 60° with the surface of the component.

5. The inspection apparatus according to claim 1,
wherein the optical axis of said illuminating unit does not intersect with either the panel recognition mark or the component recognition mark.

6. The inspection apparatus according to claim 5,
wherein the optical axis of said illuminating unit forms an angle of equal to 50° or greater and smaller than 85° with the surfaces of the panel or the component.

7. The inspection apparatus according to claim 6,
wherein said illuminating unit is provided on a side of a bottom surface of the panel opposite a side of the panel on which the component is mounted, and
the optical axis of said illuminating unit forms the angle of equal to 50° or greater and smaller than 85° with the surface of the component recognition mark.

8. The inspection apparatus according to claim 7,
wherein said illuminating unit includes illuminators configured to illuminate with lights the panel recognition mark and the component recognition mark at different directions.

9. The inspection apparatus according to claim 8,
wherein each of said illuminators is provided so that an optical axis of said illuminator is perpendicular to a straight line forming an outline of the panel recognition mark or an outline of the component recognition mark.

10. The inspection apparatus according to claim 1,
wherein said illuminating unit includes illuminators configured to illuminate with lights the panel recognition mark and the component recognition mark at different directions.

11. An inspection method for detecting an amount of misalignment, from a predetermined mounting position, of a component mounted on a surface of a panel through an adhesive which contains conductive particles, said inspection method comprising:

illuminating with a light a panel recognition mark and a component recognition mark using an illuminating unit, the panel recognition mark being formed on the surface of the panel, and the component recognition mark being formed on a surface of the component which faces the surface of the panel on which the component is mounted;

capturing an image of the panel recognition mark and an image of the component recognition mark which are illuminated with the light, using a camera provided opposite the illuminator in relation to the panel; and calculating, using the images captured by the camera in said capturing, an amount of misalignment in a positional relationship between the panel recognition mark and the component recognition mark from a predetermined positional relationship, wherein said illuminating involves emitting a light having a wavelength that allows the light to pass through the panel and the component but inhibits passage of the light through the conductive particles, and an optical axis of the illuminating unit is inclined with respect to a normal found on the surfaces of the panel or the component.

* * * * *